(12) United States Patent
Clemmensen

(10) Patent No.: US 9,866,324 B2
(45) Date of Patent: Jan. 9, 2018

(54) METHOD AND APPARATUS OF COMMUNICATION VIA SATELLITE

(71) Applicant: VT IDIRECT, INC., Herndon, VA (US)

(72) Inventor: Daniel Gardner Clemmensen, Great Falls, VA (US)

(73) Assignee: VT IDIRECT, INC., Herndon, VA (US)

( * ) Notice: Subject to any disclaimer, the term of this patent is extended or adjusted under 35 U.S.C. 154(b) by 6 days.

(21) Appl. No.: 14/682,068

(22) Filed: Apr. 8, 2015

(65) Prior Publication Data

US 2015/0295646 A1    Oct. 15, 2015

Related U.S. Application Data

(60) Provisional application No. 61/976,876, filed on Apr. 8, 2014.

(51) Int. Cl.
*H04B 10/118* (2013.01)
*H04B 10/25* (2013.01)
(Continued)

(52) U.S. Cl.
CPC ....... *H04B 10/118* (2013.01); *H04B 7/18504* (2013.01); *H04B 10/22* (2013.01); *H04B 10/25* (2013.01)

(58) Field of Classification Search
CPC .. H04B 10/118; H04B 7/18504; H04B 10/25; H04B 10/22
See application file for complete search history.

(56) References Cited

U.S. PATENT DOCUMENTS 9,178,241 B2 * 11/2015 Davidson .................. B64B 1/50
2002/0167702 A1 * 11/2002 Badesha ................... B64B 1/50
398/121
(Continued)

*Primary Examiner* — Leslie Pascal
(74) *Attorney, Agent, or Firm* — Oblon, McClelland, Maier & Neustadt, L.L.P.

(57) ABSTRACT

An apparatus for satellite communication comprising a plurality of kytoons, each kytoon of the plurality of kytoons includes a hub positioned within the kytoon, an adjustable spine that is connected to the hub and varies a diameter and volume of the kytoon, and first and second tether access tubes that are each open to the atmosphere at one end and are sealed to the hub of the kytoon at another end. The apparatus further comprises a plurality of tether segments including a first tether segment and a second tether segment, the first tether segment is connected to an anchor connected to the earth at one end of the first tether segment and to a first hub of a first kytoon at another end of the first tether segment, the first tether segment connected to the first hub through the first tether access tube of the first kytoon, and the second tether segment is connected to the first hub of the first kytoon at one end of the second tether segment, through the second tether access tube of the first kytoon, and to a second hub of a second kytoon at another end of the second tether segment through the first tether access tube of the second kytoon. The apparatus further comprises a pipe enclosed in the plurality of tether segments and that provides a lighter-than-atmospheric gas from a gas source to at least one kytoon of the plurality of kytoons so that the at least one kytoon is inflated with the lighter-than-atmospheric gas, a communication device connected to one of the kytoons, and a fiber optic cable enclosed in the plurality of tether segments and connected to the communication device.

12 Claims, 16 Drawing Sheets

(51) Int. Cl.
 *H04B 10/00* (2013.01)
 *H04B 7/185* (2006.01)

(56) References Cited

U.S. PATENT DOCUMENTS

2015/0053255 A1* 2/2015 Goldstein ............. H01L 31/042
 136/246
2015/0309157 A1* 10/2015 Knoblach ................ B64B 1/40
 342/357.25

* cited by examiner

13

13

METHOD AND APPARATUS OF COMMUNICATION VIA SATELLITE

CROSS-REFERENCE TO RELATED APPLICATIONS

This application claims priority to U.S. Application No. 61/976,876, filed on Apr. 8, 2014, the entire content of which is incorporated in the present document by reference, and is related to U.S. Pat. No. 7,046,934, issued on May 16, 2006, the entire content of which is incorporated in the present document by reference.

DETAILED DESCRIPTION OF THE PREFERRED EMBODIMENTS

Figure 1:
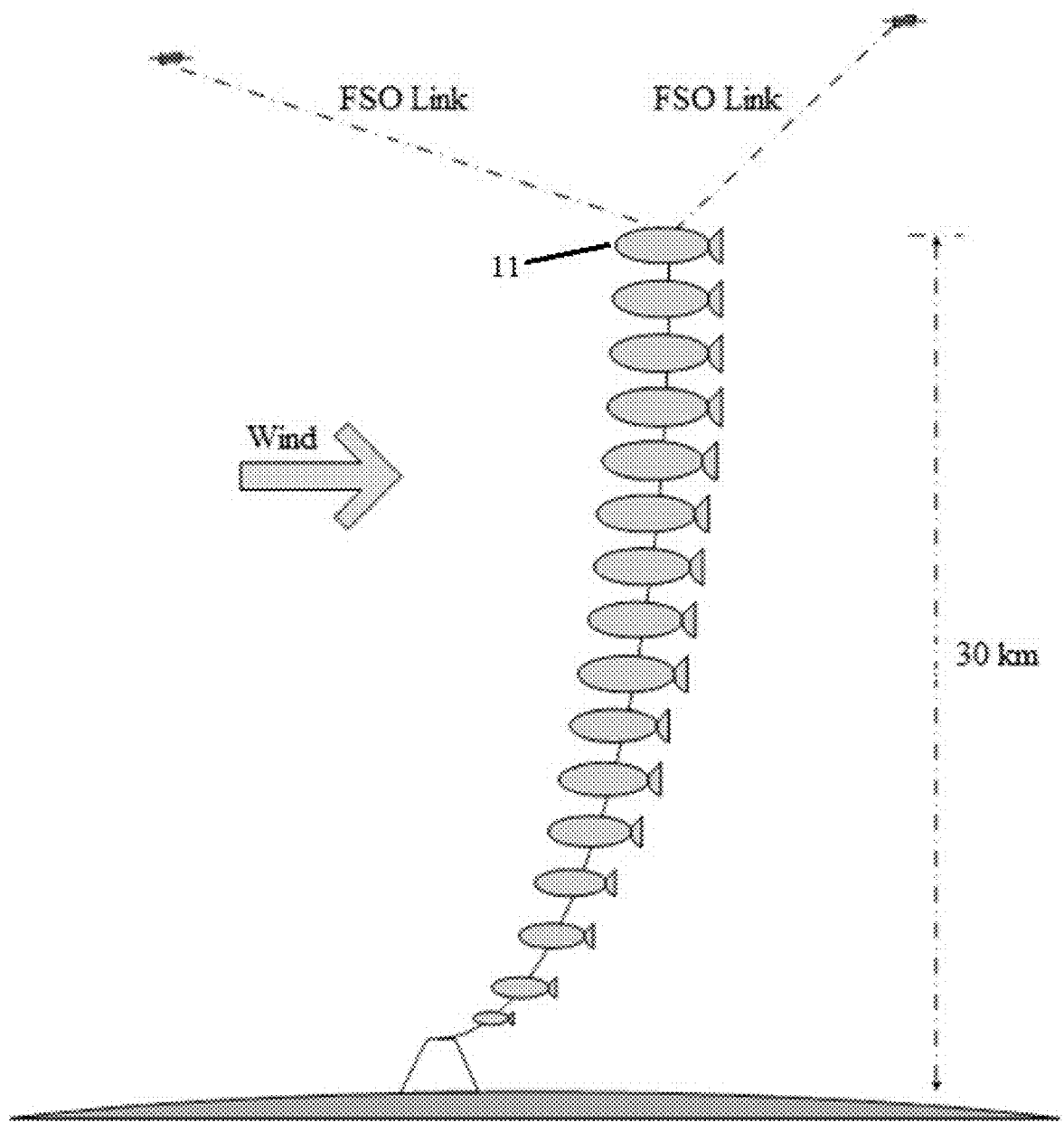
FIG. 1 illustrates an exemplary kytoon system utilized in free-space optical communication.
Figure 2:
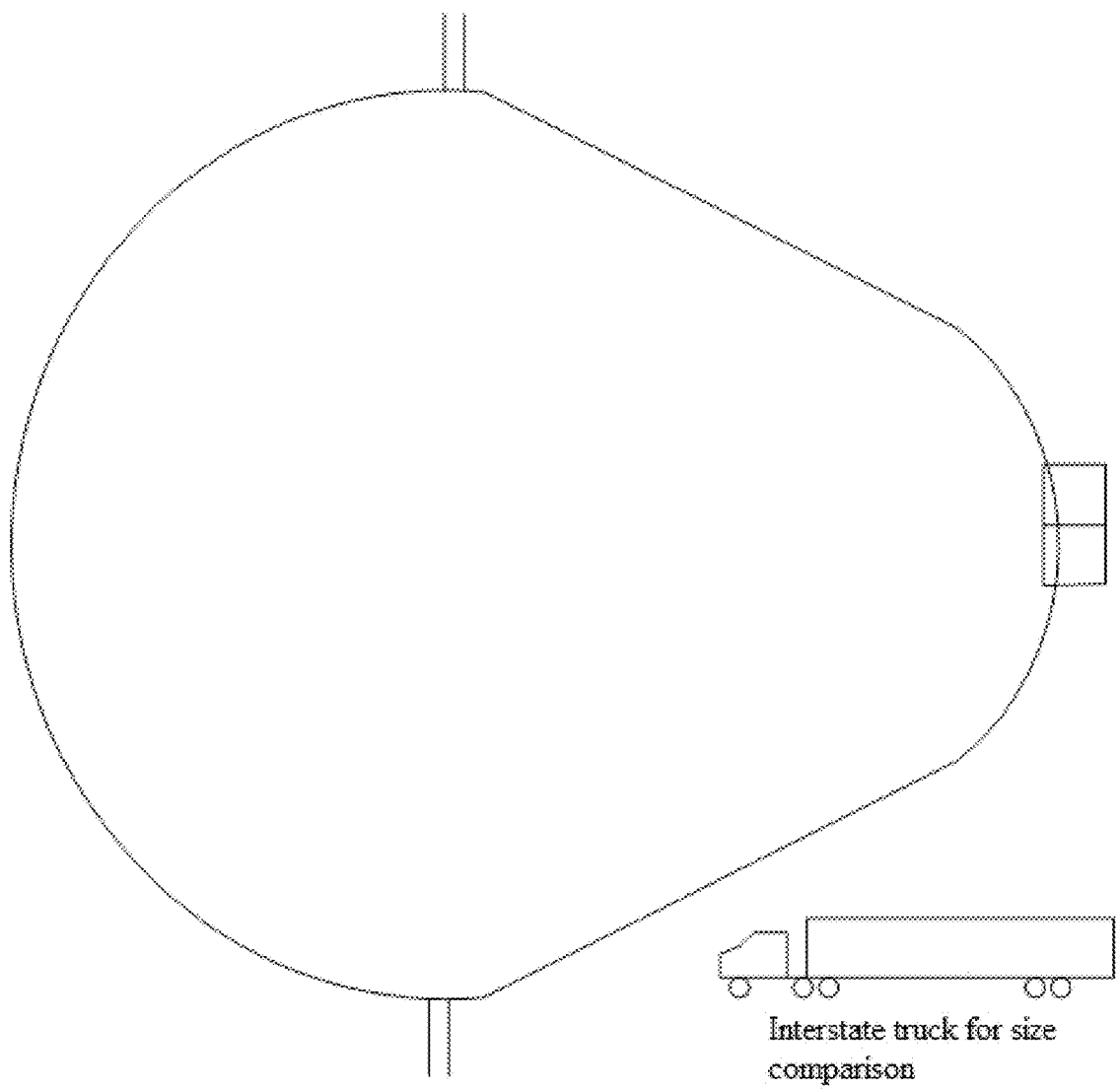
FIG. 2 illustrates a side view of an exemplary kytoon at maximum volume.
Figure 3:
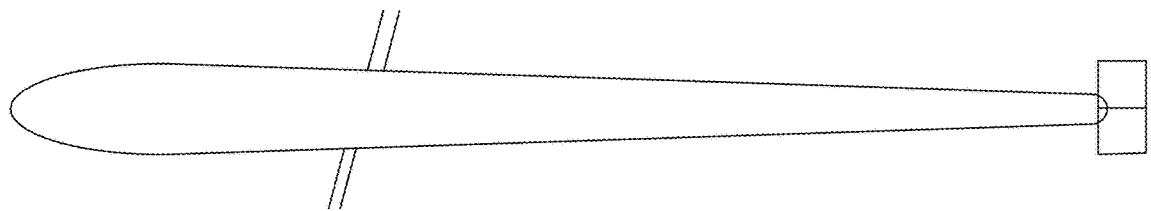
FIG. 3 illustrates a side view of an exemplary kytoon at minimum volume.
Figure 4:
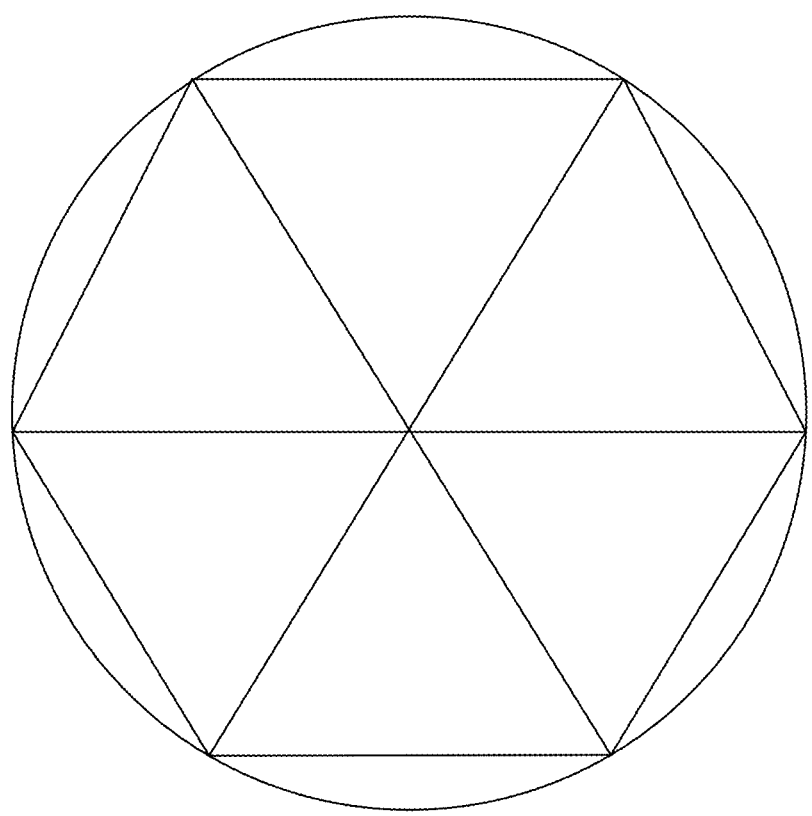
FIG. 4 illustrates a front view of an exemplary kytoon at minimum volume.
Figure 5:
FIG. 5 illustrates a side view of an exemplary spine.
Figure 6:
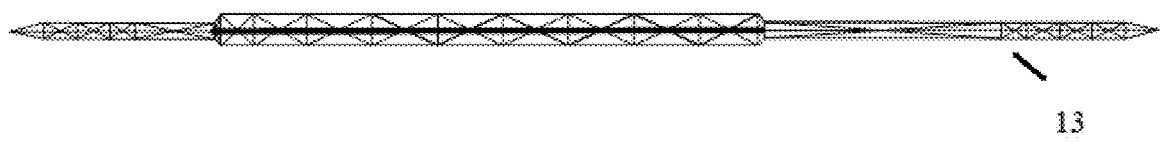
FIG. 6 illustrates a side view of another exemplary embodiment of a spine.
Figure 7:
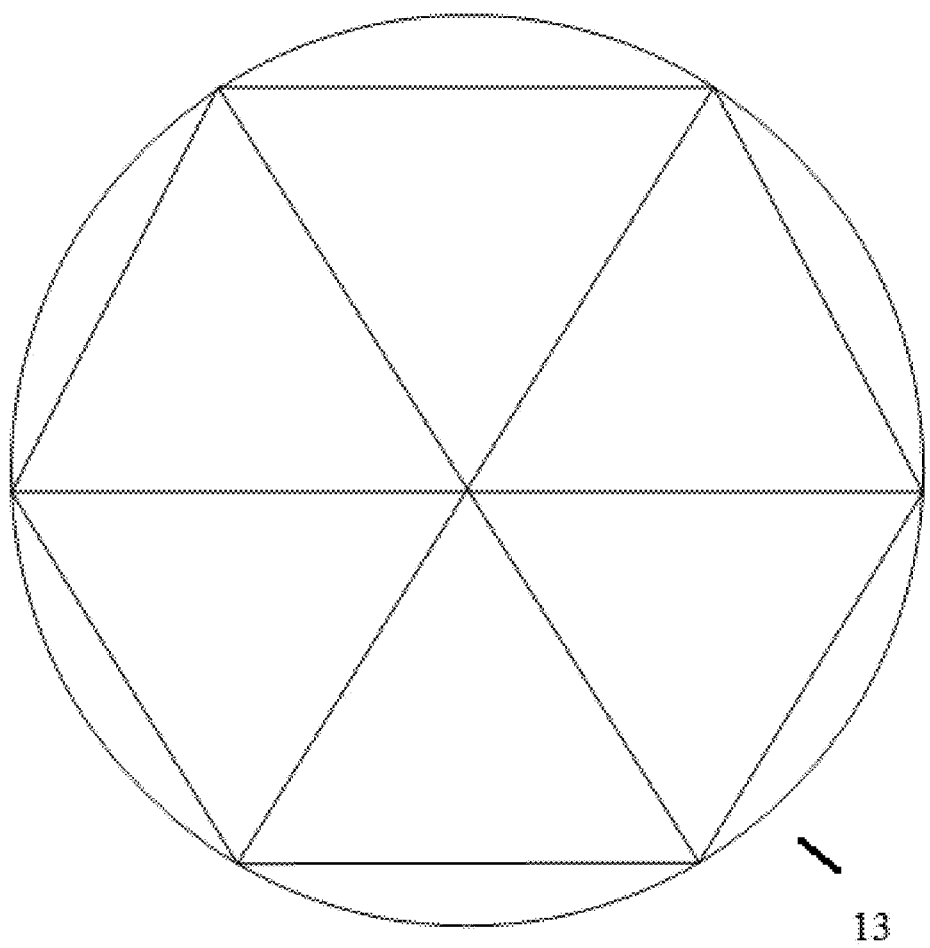
FIG. 7 illustrates a front view of a spine in accordance with FIGS. 5 and 6.
Figure 8:
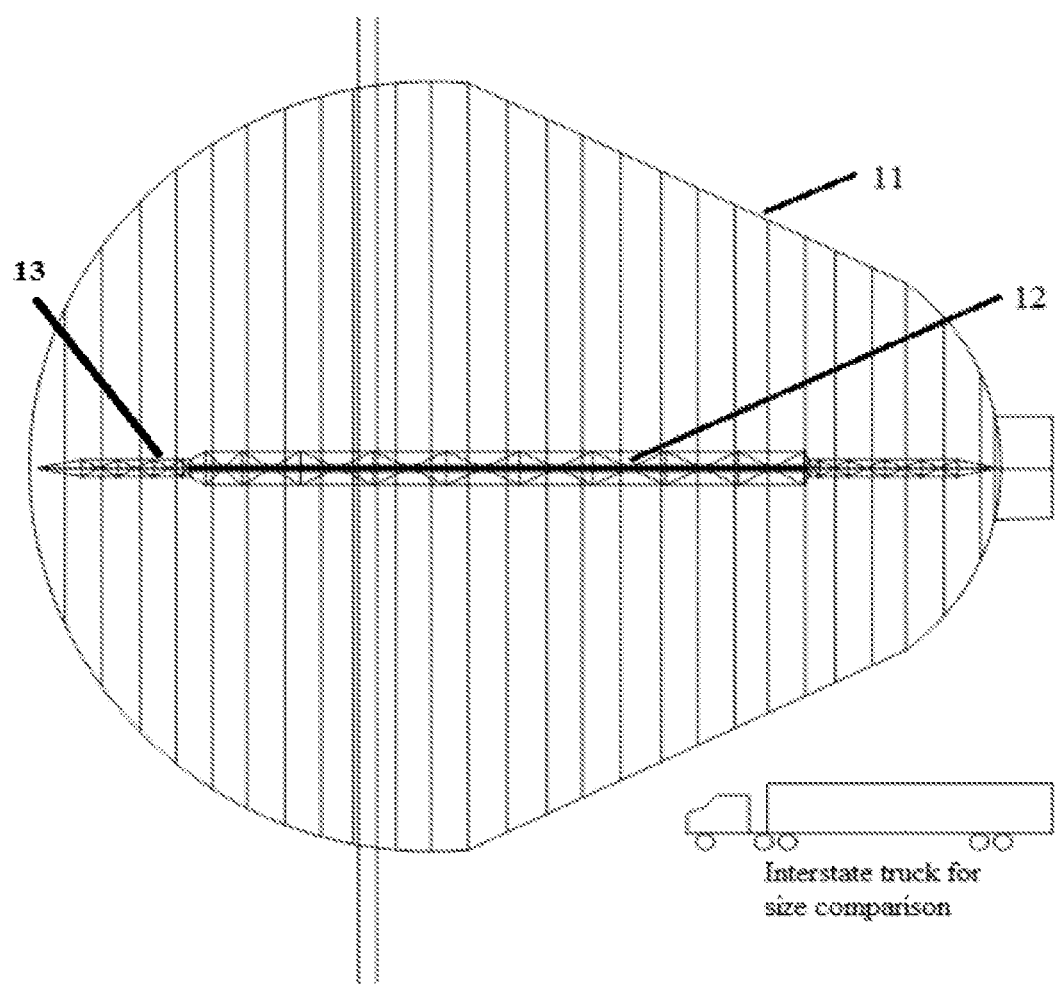
FIG. 8 illustrates a side view cross section of an exemplary hub within a kytoon at maximum volume.
Figure 9:
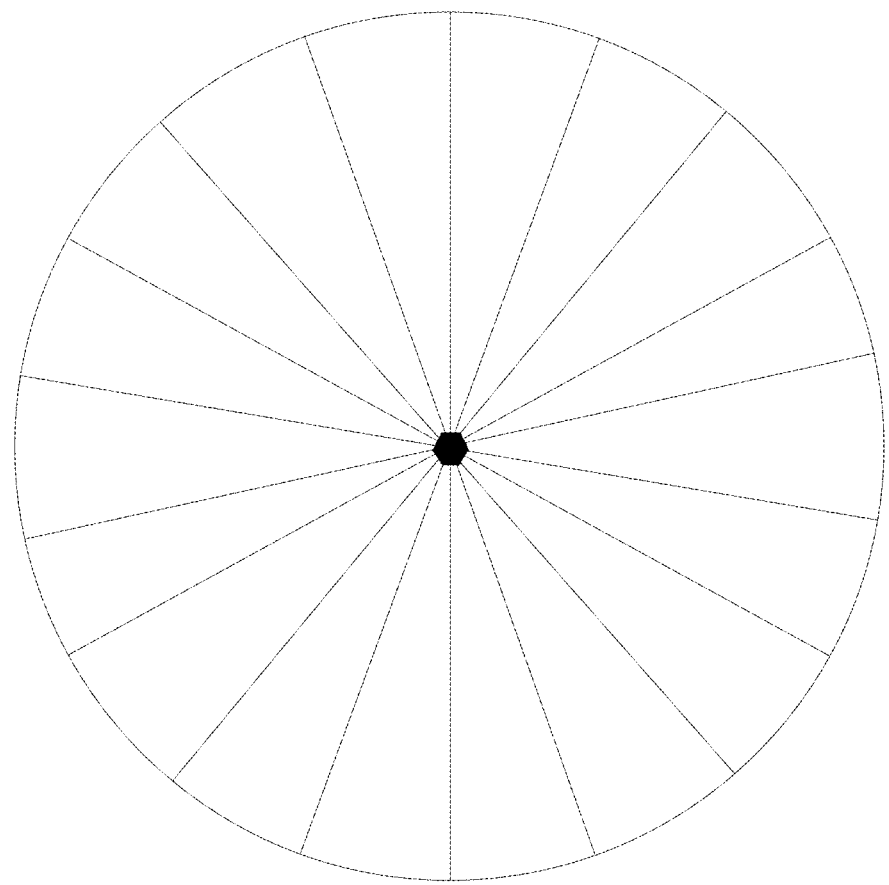
FIG. 9 illustrates a front view of an exemplary kytoon at maximum volume.
Figure 10:
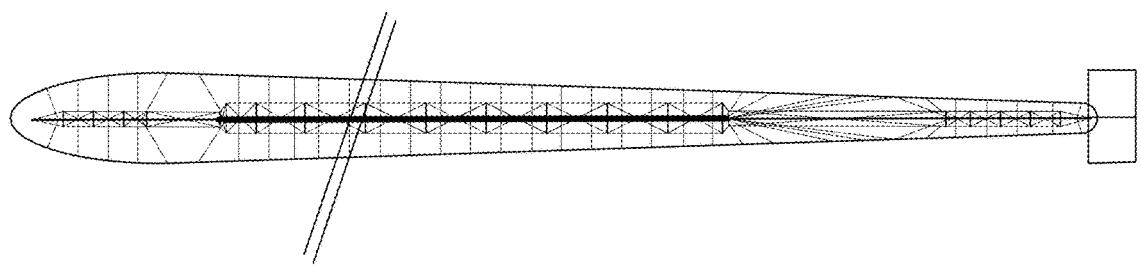
FIG. 10 illustrates a side view cross section of an exemplary hub within a kytoon at minimum volume.
Figure 11:
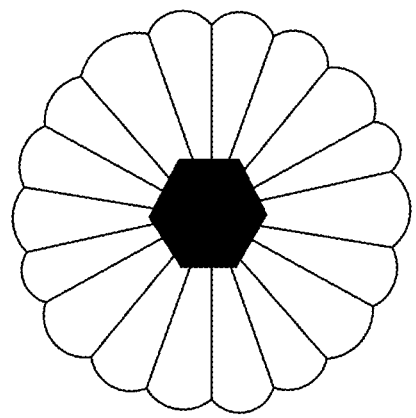
FIG. 11 illustrates a front view cross section of an exemplary hub within a kytoon at minimum volume.
Figure 12:
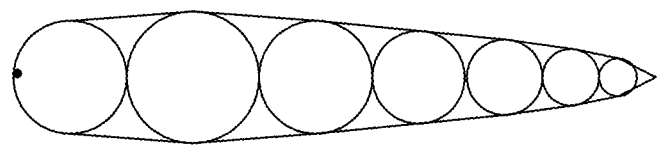
FIG. 12 illustrates an exemplary embodiment of a hydrogen pipe within a tether system in accordance with the kytoon system.
Figure 13:
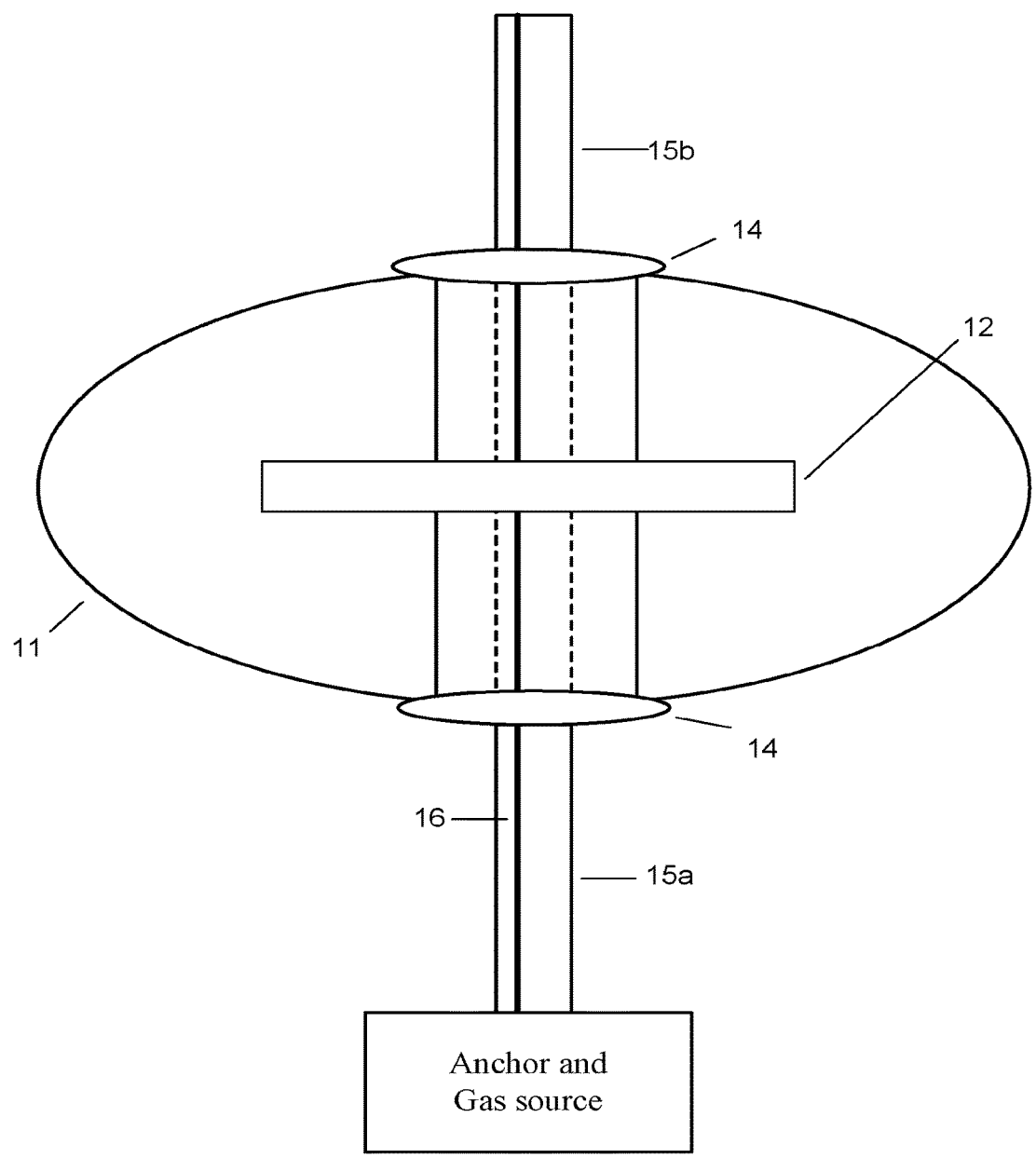
FIG. 13 illustrates a schematic of the components of an exemplary kytoon system.
Figure 14:
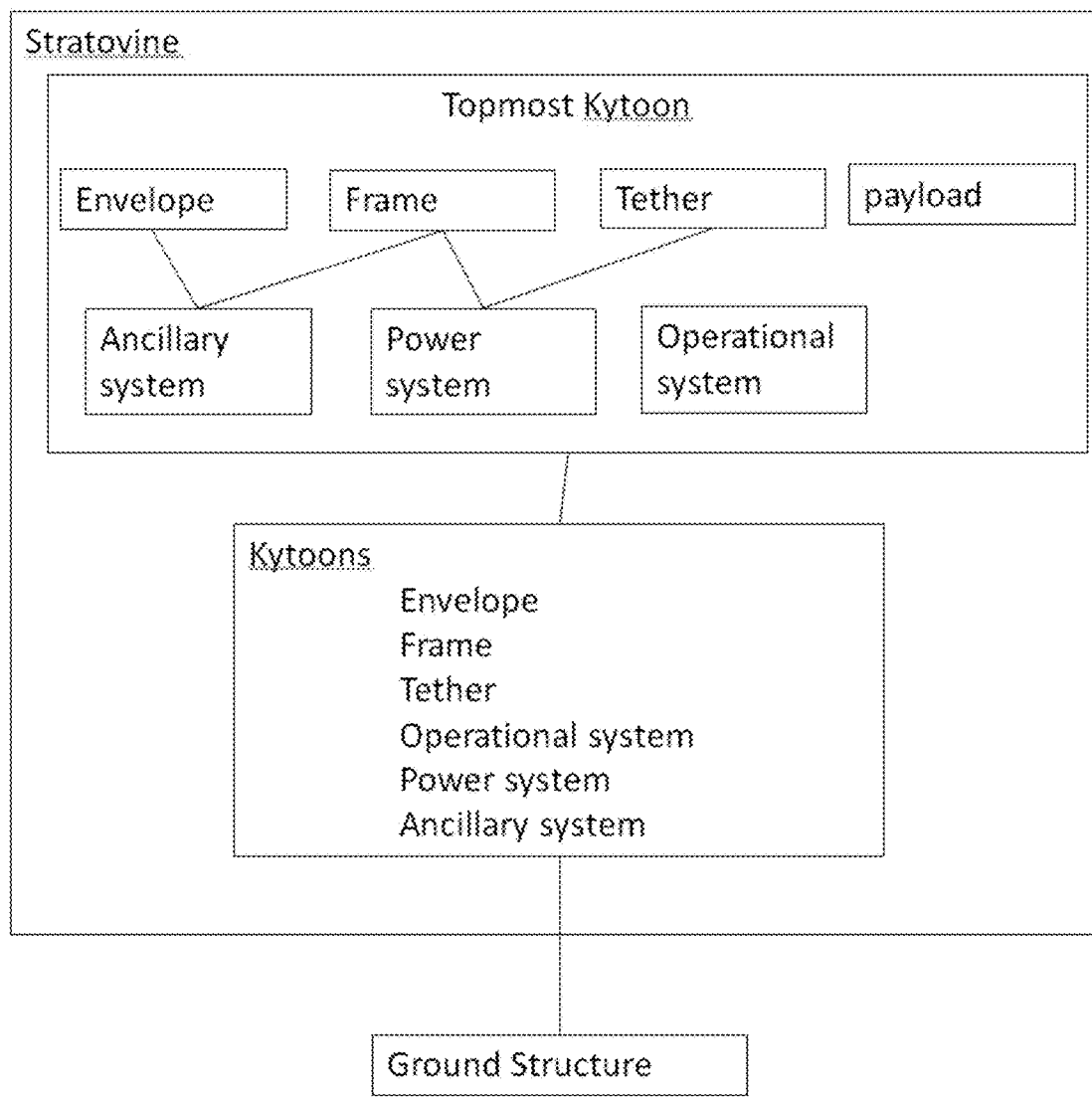
FIG. 14 illustrates exemplary components in a kytoon system.
Figure 15:
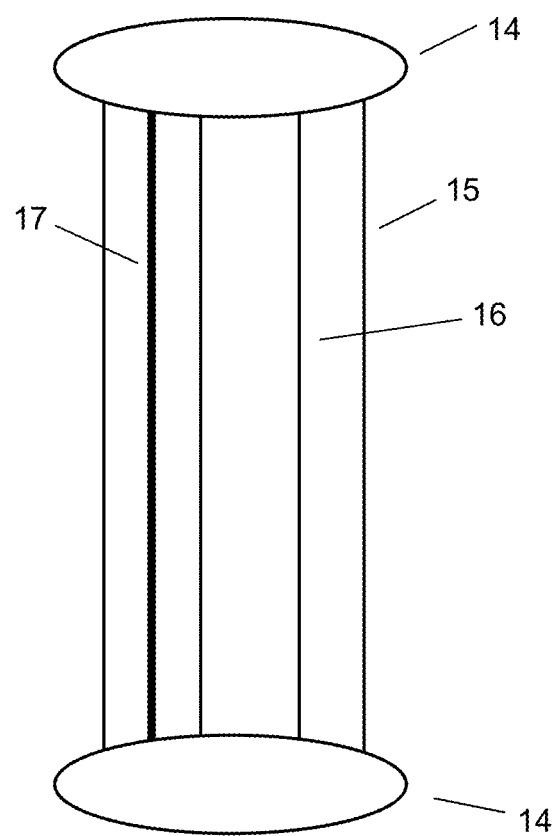
FIG. 15 illustrates a schematic of an exemplary tether segment between consecutive tether access tubes.
Figure 16:
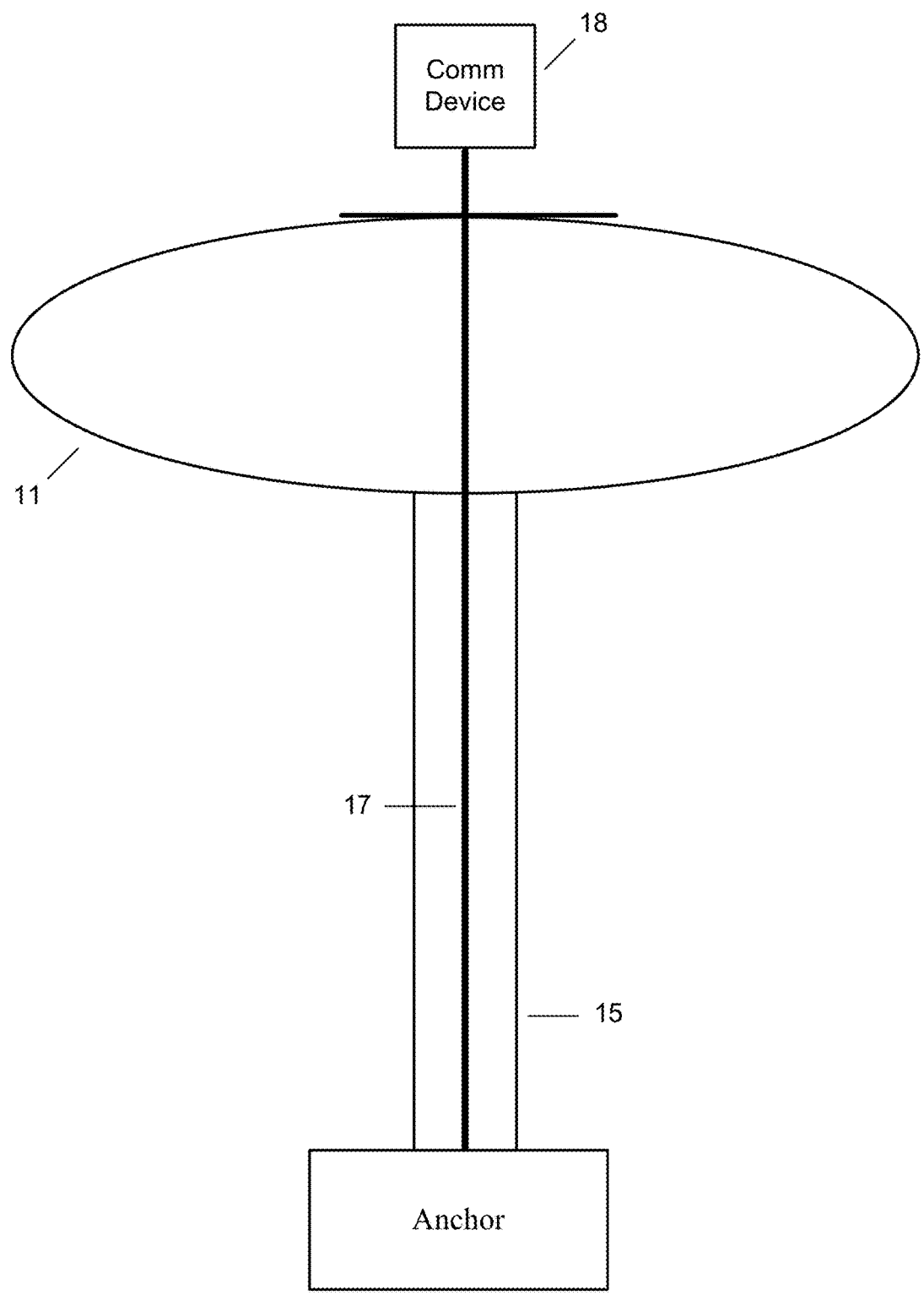
FIG. 16 illustrates an exemplary kytoon system with a fiber optic cable connected between an anchor and a communication device.

The present application describes Stratovine, which is a system and method for reliably transmitting and receiving data at up to extreme aggregate data rates between an earth station and a satellite constellation. The system utilizes a tethered balloon with a fiber optic cable in its tether. The system further utilizes a tethered chain of "kytoons" as lifting elements that support the fiber-optic cable. A kytoon is a tethered lighter-than air aerostat that acts as a kite to provide lift in windy conditions and as a balloon to provide lift in windless conditions. Stratovine is semi-permanent with power and lifting gas supplied via the tether. The topmost kytoon supports multiple free-space optical (FSO) transceivers together with equipment to relay between signals on the fiber cable and signals on the FSO links. The FSO links connect with satellites. The terrestrial end of the fiber cable connects with additional relay equipment that in turn connects the signals to a terrestrial network.

The system concept is independent of the type of relay used at the top and the type of relay on the ground. It is also independent of the type of transmission on the fiber link. DWDM may be in both directions on the fiber, with optical switching and amplification at the top between the FSO transceivers and the fiber. There are as many individual fiber pairs in the fiber cable as required to support all of the FSO links, and there is not necessarily a one-to-one link between a fiber pair and an FSO link.

As with the single-balloon concept, the system and method solve two problems: the total data rate may be many orders of magnitude higher than the rate that can be handled in the radio spectrum, and the signal is not subject to rain fade. In contrast with a single balloon, Stratovine may be semi-permanent and more robust against the vagaries of weather. It is also more practical, as it is not necessary to support the entire weight or tension of the tether from a single balloon.

Each kytoon is dramatically smaller than a balloon used in the single-balloon concept, and the kytoons use active systems to vary their volume and lift. This dramatically simplifies the problem putting the system in place through the winds in the upper atmosphere.

While the system is most effective when used with FSO links, one or more radio transceivers can be implemented instead of or in addition to FSO. This is not cost-effective for frequencies that are not subject to severe rain fade or other atmospheric effects except in special circumstances.

A Stratovine is a semi-permanent structure. It remains in place for months or years at a time and is taken down only for maintenance. Before it is taken down a second Stratovine can be put in place to take its place. Alternatively, the system can be designed to allow individual kytoons and tether segments to be replaced while leaving the structure as a whole fully operational.

Atmospheric density decreases exponentially with altitude, so a kytoon at higher altitudes may have a larger volume of lifting gas for the same net payload when acting as balloons, and larger effective lifting area when acting as kites. The system may include mechanisms to adjust the volume and aerodynamic lift to dynamically adapt to different wind conditions.

The Stratovine may support its topmost kytoon high above essentially all clouds. The nominal operating height is 30 km (more than 98,000 feet.) This requires a chain of at least 30 kytoons. There is one class of clouds that can exceed this height. It is rare, tenuous, and occurs only in polar regions.

An engineering problem for a kytoon system is tension in the tether produced as a result of holding the system in place against the force of the wind. The lift required to support the weight of the kytoons and tether in windless conditions is generally small compared to the force required to oppose the wind.

Referring now to the drawings, wherein like reference numerals designate identical or corresponding parts throughout the several views.

Stratovine Elements

Kytoons

Each kytoon supports its own weight and the weight of the tether that connects it to the next-lower kytoon. The tether length between kytoons is nominally one kilometer, but this is a design tradeoff: longer lengths require bigger kytoons.

The lowest several kytoons can use hot air as the lifting gas. The air is heated by on-board heaters fuelled or powered by a fuel or power line from the ground that is part of the tether. Hot air is used in the lower kytoons primarily because hydrogen is perceived to be unsafe.

The higher kytoons are hydrogen filled. The hydrogen is supplied by a hydrogen pipe that is part of the tether. Hydrogen can be produced as needed near the base of the tether in abundance and at relatively low cost.

Helium is an excellent lifting gas from a technical standpoint and can be used in the Stratovine. However, the Stratovine uses a large amount of lifting gas and there are inevitable losses to the atmosphere. Helium is an expensive and limited resource whose continuous supply in high volume cannot be guaranteed. Therefore, it is unlikely to be an economically feasible option for any of the kytoons in the Stratovine system.

The kytoons are shaped to act as kites, providing additional lift when there is a wind relative to the kytoon's tether point. The lowest kytoon is tethered to the ground structure, while the remaining kytoons are each tethered to the next lower kytoon.

There is no requirement that the kytoons be identical. Each kytoon can be optimized for its operating altitude. The highest kytoons will be physically larger to support the same weight of tether and payload, but these kytoons will not be subject to the same stress of weather as lower kytoons and can therefore be of lighter construction. However, since the kytoons have a dynamic control systems to adjust volume and aerodynamic lift, it is possible to use identical kytoons of a few standard sizes, and this may be cost-effective due to economies of scale. Alternatively, using kytoons of the same size, kytoons at lower altitudes can support longer tethers.

Pressure declines exponentially with altitude. Pressure at 30 km is only about 2% of pressure at ground level so the topmost kytoon may have about 50 times the volume of the lowest kytoon to support the same gross weight, which means it is roughly 3.5 times longer, taller, and wider.

Because the kytoons are externally supplied with lifting gas, the kytoon envelope does not need to provide a perfect barrier to hydrogen diffusion. Hydrogen lost by diffusion is replaced from the pipe in the tether. This allows the use of lower-weight envelope material.

Each kytoon has active operational systems. The topmost kytoon has an additional payload.

The topmost kytoon carries the top-end payload. It is therefore likely that it will have a short (and therefore light) tether to the next-lower kytoon. The "topmost kytoon" may instead be a complex comprising multiple kytoons to support the top payload.

The kytoons are constructed so that an upward force on the tether from a higher kytoon is transmitted to the lower tether directly.

The kytoons incorporate aircraft warning lights and radar transponders.

Tethers

The tethers are linked at each kytoon to form a tether system. The tether system comprises four essential subsystems and some ancillary systems. The essential systems are: tension element, fiber cable, power cable, and hydrogen pipe. The tether may be an integrated structure: for example, the tension elements may be part of the walls of the hydrogen pipe or part of the sheath for the fiber.

The tether segments need not be identical. Progressively lighter tethers at progressively higher altitudes may be a good design choice. The length of the segments can vary also.

Tension Element

The tension element is some high strength-to-weight material, nominally Kevlar or Zylon. It may provide sufficient strength in tension to prevent the tether from breaking under worst-case wind conditions.

Optical Fiber Cable

The optical fiber cable includes multiple individual optical fibers. This is special-purpose unarmored cable designed to withstand the fairly benign environment of the tether rather than an underground or undersea environment.

If the system as a whole is designed to allow in-service replacement of individual tether segments, there are two options for the fiber cable. The cable can be designed in segments, or a continuous cable can be loosely coupled to the rest of the tether and separately supported at each kytoon. A segmented cable is preferable from a mechanical design perspective, but this requires a fiber coupling for each fiber in the cable at each kytoon. This may or may not induce unacceptable signal degradation. 30 km total is not long by today's technical standards, but 30 connections is a high number. If the system is designed with a single continuous cable, then in-service replacement requires the system to support the weight of two cables during a replacement cycle.

Any tension member elongates under tension to some extent. Practical optical fiber cables use Kevlar as a tension element, but it is unreasonable and unnecessary to assume that additional strain relief is not needed for a vertically-oriented fiber of 30 km or even 1 km. Instead, the fiber cable will be connected to the tension cable at intervals of 100 m, with a slight amount of extra fiber cable length to provide strain relief.

Power Cable

This is a two-wire electrical cable. It provides power for the electronics and warning lights. It is possible to use electrical power to heat the lower kytoons: this is design tradeoff. If some or all of the tension material is Zylon, it may be possible to use the Zylon as the conductors also.

Hydrogen Pipe

This is a soft plastic low-pressure pipe. It supplies hydrogen for the higher kytoons. It is possible to use hydrogen as fuel to heat the lower kytoons: this is a design tradeoff. It is also possible to use hydrogen as fuel for generators and propulsion systems.

Ancillary Systems

Warning Lights

The tether will probably require aircraft warning lights and passive radar corner reflectors.

Lightning Arrestor System

The tether may need to include additional cabling and dissipation points for a lightning arrestor system.

Power Options

There is equipment that consumes power associated with each kytoon, and each kytoon also provides power to the aircraft warning lights along its tether segment.

There are multiple possible ways to provide power. An individual Stratovine structure can employ any one or more of these methods.

Electrical Power from the Ground

The tether can incorporate a pair of electrical conductors to provide high-voltage AC or DC electrical power.

Electrical Potential Difference

The Earth's atmosphere maintains an electrical potential difference of thousands of volts per vertical kilometer. This potential difference can be harnessed to provide power by using conductors in the tether.

Hydrogen

Hydrogen is supplied up the pipe in the tether to make up lost lifting gas for the higher kytoons. This same source can be used to fuel motor-generators or fuel cells and can be burned to heat the hot-air kytoons. Waste heat from the generators contributes lift by heating both kytoon types. Hydrogen may also be used to drive a propulsion system.

The feasibility of this approach depends on the availability of sufficient atmospheric oxygen. Therefore, there may be a maximum practical altitude for hydrogen power production. Kytoons above this height can be supplied with electrical power generated below this height. Air-breathing turbines (jet engines) operate at least as high as the 20 km height that can be reached by the U-2 aircraft in sustained level flight. An air-breathing turbine depends on constant airflow to avoid ingesting its own exhaust. This is not a problem for aircraft but can affect a kytoon in a dead calm.

Wind Turbines

Wind near the ground is a variable power source, but winds aloft are less variable. It may be possible to produce electricity from wind turbines at one or more of the kytoons. Excess electricity can be sent down the tether to the ground and used to produce hydrogen. The hydrogen can be stored and sent up the tether to generators that are used when there is no wind. Wind turbines are probably infeasible unless integrated with a propulsion system, because the generators will add to the wind loading and thus to the maximum tether tension. Maximum tether tension is almost certainly the most important design constraint for the Stratovine.

Wind-Driven Tension Oscillation

It is also possible to derive power from wind-driven variation in the tension on the tether itself. Experimental kite-based power systems have been built. This system works by controlling a kite to alternately increase and decrease the tether tension by altering its trim to vary the lift. Power is produced on the ground by applying the varying tension to lift and lower a crank or by some other pumping action of this type. This approach is likely to be practical for the Stratovine because almost all elements needed for a kite power system may already be elements of the Stratovine. One possible implementation uses the tether to lift a heavy piston against pressure. The pressure builds above the piston until it opposes the maximum tether tension. As the tension is reduced by adjusting the lift on one or more of the kytoons, the piston's weight increases pressure below the piston. The piston's chambers are connected through valves to drive a turbine. This system can be hydraulic or gas based. An advantage of this approach is that the system also acts as a shock absorber to buffer against sudden unanticipated changes in tension. This system is active only when the Stratovine is not in a maximum wind condition, and therefore has margin in its tension budget.

It is also possible to add a tension-driven power generator in each kytoon. The kytoons dynamically induce a periodic tension change by adjusting aerodynamic lift so that the tension from a kytoon's upward tether differs from the tension in its bottom tether. By controlling the kytoons in pairs, the tension on the tether segment between the members of a pair can be made to oscillate while holding the tension on the tether above the upper member of the pair and the tension on the tether below the lower member of the pair relatively constant.

This scheme cannot extract energy at altitudes where there is no wind. However, it is possible to induce a travelling wave of periodic tension variation using a kytoon at an altitude where there is wind. This tension oscillation will propagate to windless altitudes to drive the generators in kytoons at those altitudes. A condition in which there is no wind at any altitude from the ground to 30 km is extremely rare, but in such a case tension oscillations can be induced from the ground.

Kytoon Operational Systems

Each kytoon has active systems to support its basic function of providing lift. The topmost kytoon has these systems in addition to its communications payload.

Each kytoon consumes electrical power. Depending on design tradeoffs, electrical power can come from the tether, or the kytoon can have a hydrogen-fueled motor-generator or fuel cell. This tradeoff may be made independently for each kytoon. Each kytoon has electronics to monitor and control its systems. These connect via a monitoring link. Nominally, one of the fiber pairs in the cable is used to communicate to all of the kytoon monitors using a multidrop or daisy-chain approach such as a PONS scheme.

Some or all of the kytoons have heaters for the lifting air and for de-icing. The heaters can be electrical or they can burn hydrogen.

Each kytoon has a lift management system. This system allows a centralized controller to adjust the amount of lift. The system controls the gas temperature and can vent gas if necessary. The control system also controls the attitude of the kytoon with respect to the tether. This affects the lift provided by the action of wind on the airfoil shape of the kytoon. The de-icing system is integrated with the lift management system to expand and contract the kytoon as needed to shed ice.

Each kytoon has an aerodynamic shape that is intended to minimize drag by selecting a shape with the minimum drag coefficient. The nominally ideal shape is that of a blimp. A "zero pressure balloon" does not maintain an aerodynamic shape, so methods of controlling the shape of the kytoon may be employed. The classic approach uses slight positive gas pressure to maintain shape, as with a blimp. This can be replaced or augmented by structural members, as in a rigid or semi-rigid airship.

Since the kytoon is sized to provide sufficient lift in windless conditions, any lift provided by the aerodynamic forces of the wind will add additional tension to the tether as a tradeoff to the kite action that opposes the wind's tendency to move the tether away from vertical. Each kytoon adds to the wind loading in proportion to its cross sectional area, and its cross-sectional area is related to its volume and hence its buoyancy. A kytoon differs from a free balloon in that no buoyancy is needed when there is sufficient lift provided by the kite action. Therefore, it is possible to dynamically reduce the cross section as the wind speed increases. As a general rule, reducing the total drag requires reducing the volume. By contrast to other aircraft and balloons, this is feasible for a kytoon. To reduce the volume, we can vent lifting gas, compress lifting gas, or force gas back into the tether. There is a tradeoff: venting gas will require that we replace it from the tether, compressing the gas requires the weight of a compressor and a tank of some sort, and forcing gas into the tether has distributed effects on the system. Since the purpose of compression is a relatively modest volume reduction, the pressure can be quite modest. The "tank" can be a constant-volume balloon within the kytoon. Volume reduction is effective only if the kytoon can maintain a shape with a low drag coefficient as the volume is reduced. This will require additional active systems.

One possible mechanism for reducing the volume while maintaining an airfoil shape is to use a system of radial ropes. We reduce the volume by pulling pleats of the envelope toward the long axis of the kytoon, reducing the cross-sectional diameter. This can be achieved by using a fat blimp shape at maximum volume, and reducing the with a set of radially-oriented pleats that make the blimp progressively skinnier as the volume is reduced. The long axis may be lengthened as the diameter is reduced.

Top Payload

The payload for the topmost kytoon (or kytoon complex) includes one or more FSO transceivers and a signal relay, in addition to systems that are common to the other kytoons.

FSO Transceivers

The topmost kytoon supports one or more FSO transceivers. Each transceiver includes a steerable stabilized telescope that can be aimed with very high accuracy at any target in line of sight of the transceiver. The primary use of the transceivers will be communication with satellites in Earth orbit. Other targets can be any location in line of sight of the top kytoon, including other locations beyond the atmosphere (lunar and solar system missions,) other Stratovines, or other targets in the atmosphere such as free balloons, drones, or other aircraft. Each transceiver can transmit modulated light signals and receive modulated light signals. The nominal signal comprises one or more separately-modulated wavelengths of light in the range of wavelengths for which the upper stratosphere is transparent. This includes the near ultraviolet, the visible spectrum, and the infrared spectrum. A high-capacity FSO link using technology available in 2014 might employ a DWDM system with 80 channels at 40 Gbps in the optical C-band and another 80 channels at 40 Gbps in the optical S-band to take advantage of technology developed for fiber optics. However, there are thousands of wavelengths available at spacings that support 40 Gbps each, all potentially available in the same FSO link at the same time.

Each FSO transceiver has a physical size and power budget suitable to support the link for which it is designed. A transceiver communicating with a single LEO satellite at a time might use a 3 cm diameter telescope and a 3 W power budget to support a single 40 Gbps link.

Each transceiver accepts input from the relay for each optical channel. It uses this input to modulate the wavelength associated with the channel. The input depends on the nature of the relay. Each FSO receives photons from its target and forwards their signal content to the relay. The output depends on the nature of the relay.

Relay

The relay is an element of the topmost payload. The relay accepts signals from a fiber in the tether and passes the signal to an FSO element. It accepts signals from FSO elements and passes them to a fiber in the tether. There are many possible implementations of this function. A specific implementation of the Stratovine can employ one or more relays, each implementing one or more types of relay functionality.

The simplest possible function is a direct passive connection of a fiber pair to an FSO. Photons reaching the FSO's telescope from its target are directed into the downlink fiber. Photons reaching the "relay" from the uplink fiber are directed to the FSO and sent via the telescope to the target.

The next-most complicated relay is identical to the passive relay, but it adds an optical amplifier in each direction.

With increasing complexity, the relay performs increasingly complex operations in the optical domain, including switching optical channels between multiple tether fibers and multiple FSOs and optical wavelength conversions.

The relay can also operate in the electronic domain, converting optical signals into electronic signals as they are received from the tether fibers and FSOs, and converting electronic signals into optical signals before sending them to the fibers and FSOs. In this domain the "relay" function can be anything from simple "triple R" (reamplification, reshaping, retiming) through all forms of circuit switching and all forms of packet switching.

Ground Structure

The lowest kytoon of the Stratovine is tethered to a ground structure. Depending on the location, the ground structure may be a short or tall freestanding tower or a guyed mast. Because the Stratovine is subject to wind loading, the forces on the tether can be enormous and can be applied to the ground end of the tether with a large horizontal component in any direction and with a large component in the upward direction. The structure may be designed to accommodate these forces.

The structure may support normal operation and maintenance operations.

Normal Operations

The fundamental function of the ground structure is to oppose the tether tension. Tension may be on the order of one million Newtons or more. This can be opposed by a physical mass weighing 100 tons for vertical lift, but will require anchoring to the surface to oppose the horizontal component. By comparison to tension structures such as suspension bridges, this is a simple engineering problem. However, the structure may allow the tether to re-orient to any direction and elevation, and the tension varies across a large range, from zero to its maximum, while the direction varies in both elevation from near horizontal to vertical and through all points of the compass.

The structure provides a communications relay function, passing signals between one or more terrestrial fiber links and the fibers in the tether. The relay can provide any one or more of the functions provided by the "top" relay.

The ground structure also provides electrical power and hydrogen services (generation, storage, and delivery to the tether).

Maintenance Operations

The ground structure supports maintenance operations for the Stratovine. These include initial deployment and subsequent replacement of Stratovine elements or of the structure as a whole.

Launch and Recovery

Launch of a Stratovine is done incrementally, using a double winch structure. The winch can pay out the tether while maintaining tension. Because the tether is more complex than a simple rope, the winch mechanism is correspondingly complex. One winch is mounted above the other with a space of several meters between them. Either winch can operate against the maximum tension of the tether. The area between the two winches is the operating area. It is used to attach kytoons and tethers during launch and to detach them during recovery as described here.

The tether cannot be stored as a roll under tension on a spool. We assume instead that it is stored in segments, with one segment used under each kytoon. These one-km segments are loosely folded (e.g., in 20 m sections.) Each winch mechanism is a set of multiple clamping opposed rollers that clamp the tension member of the tether tightly and the remainder of the tether loosely. Each roller set is capable of opposing the maximum tether tension without slipping and without damaging the tether.

Initial Kytoon Lunch

The top kytoon is launched first. The top end of its tether segment is fed into the lower rollers from below and connected to a flaccid kytoon anchored in the operating area. The bottom end of the segment is connected to the hydrogen and power systems on the ground, and the top kytoon is filled via an external connection to a slight positive buoyancy. Its volume is adjusted to provide the proper pressure to maintain its shape at that buoyancy. The kytoon systems are powered up and the kytoon pressurizes its storage system with enough hydrogen to operate in the current wind conditions. The external fill is disconnected, and the kytoon is now operational, but still near ground level. At this point the lower winch rollers are activated and the kytoon is allowed to pull itself upward using lift, buoyancy, or both as conditions warrant until the bottom of the tether segment nears the rollers, at which point the winch is stopped.

Additional Kytoon Launches

With the winch stopped and a tether segment clamped near its bottom end in the lower rollers, the upper rollers are clamped to the tether and the tension is transferred to them. The lower rollers are disengaged, the upper rollers allow the tether tension to pull the bottom end of the tether into the operating area and the upper rollers are stopped. Another kytoon is now connected to the upper tether and the top end of a new tether segment is passed through the lower rollers and connected to the kytoon. The top rollers are disengaged, and the remainder of the launch is otherwise similar to the initial kytoon launch. This process is repeated for each succeeding kytoon.

Launch Conclusion

After the last kytoon reaches its operational height, the bottom of the bottom tether is connected to its fixed connections and the bottom rollers are disengaged.

Recovery

The recovery process is approximately the reverse of the launch process. The lower rollers are engaged on the bottom-most tether and the tether is detached from its fixed connections. The rollers are started and the tether is pulled down and folded until the lowest kytoon is in the operational area. The upper rollers are engaged on the tether above this kytoon, and the kytoon is detached from the lower tether and deflated. The kytoon is detached from the tether and removed from the operational area to the storage preparation area, as is the now-detached lower tether segment. The upper rollers are started and the still-active tether is pulled down far enough to reach below the lower rollers. The lower rollers are engaged on the tether. The upper rollers are disengaged, and the process is repeated until the top kytoon is finally deflated.

Extreme Wind

The lower Stratovine is potentially subject to violent winds including hurricanes and tornadoes. The system may be designed to withstand these if possible, and to "fail soft" if a failure occurs. The system as a whole may be engineered and sited to ensure that failure occurrences are extremely rare: the Stratovine system should be at least as reliable as undersea fiber-optic systems. One possible way to "fail soft" is to permit the Stratovine to detach from the ground structure. This will allow it to be blown away with the wind. Each tether can then detach from its lower end, converting each kytoon into a free-flying aerostat dangling a tether segment. Each kytoon's lift management system can then land the kytoon in a controlled manner. Each kytoon is roughly the size of a commercial hot-air balloon but is much better equipped. If the kytoons are detached in attached pairs, some control of flight direction becomes possible by tacking when winds are in different directions at two flight altitudes. Long-duration free flight is not possible, since the system is designed for replenishment of lifting gas and power from the ground. However, each kytoon will still have hours or days of controlled flight. The only element of the system that is really expensive is (possibly) the top payload. The top kytoon has the most lift resources and the longest loiter time, and therefore theoretically has the most options for selecting a landing site and time.

Tether Failure

If the tether breaks for any reason (mechanical failure, aircraft collision, lightning, sabotage,) the Stratovine should "fail soft." The kytoons above the break will act as in the extreme wind case. The kytoon immediately below the break will shut off the gas flow to the upper tether, and the ground system will recover the remainder of the kytoon below the break.

If a tether segment gas pipe fails, the kytoon below the failure will shut off the gas flow and the ground system will begin to recover the Stratovine. The kytoons may be designed to have sufficient reserve gas to maintain lift during this recovery. This is not likely to be a problem.

If the fiber breaks, the ground system will recover the Stratovine. While it is possible to recover a Stratovine without communicating with the kytoons, the operation runs more smoothly with when the control system retains communications. Therefore, each kytoon's control system should have a radio link in addition to its fiber link.

If the power connection fails on a tether link where it is needed, the Stratovine may be recovered from the ground.

Kytoon Failure

The system should be designed to continue to operate if a single kytoon fails, for some failure types. It is clear that any failure that interrupts the essential functions of the tether (tension, fiber continuity, gas flow, power) will cause the Stratovine as a whole to fail as in a tether failure. but other Kytoon system failures can be made non-catastrophic.

If lift or lift control is lost, the kytoons above the failed kytoon can increase their lift. The system may be designed of accommodate the increased tension in this case where possible. Note that this is not possible when the top kytoon fails and is likely to be infeasible when the kytoon immediately below the topmost kytoon fails.

The kytoon gas control scheme may be designed so that a failure of the kytoon envelope or of the control system causes the system to passively shift into a "shunt" mode, wherein the hydrogen pipe in the lower tether is connected to the hydrogen pipe in the upper tether and hydrogen is not allowed to escape from the tether within the failed kytoon.

When the kytoon incorporates a power system that employs oscillating tether tension, that system may passively "fail soft." It may passively lock in place, passively transferring tension between upper and lower tethers.

Lightning

Lightning will affect the Stratovine. We may determine if any portions of the Stratovine are subject to direct damage, and we may determine if the hydrogen pipe or hydrogen-filled kytoons are unacceptably susceptible to lightning effects. The Stratovine does not have exactly the same characteristics as a ground structure, nor the characteristics of a free-flying structure.

Normal Wind

The kytoons will encounter different wind conditions at different altitudes. The system should be designed to accommodate "hundred-year winds" at all altitudes. The aerodynamic properties of each kytoon may be designed to allow the kytoon to provide the appropriate lift as wind conditions change. The kite-like action causes each kytoon to try to rise as the wind increases, which prevents the wind from causing the Stratovine as a whole to exceed its maximum permitted displacement from the vertical.

Weight, Kytoon Size, and Optimization

A model is required for tether weight per unit length based on required tensile strength and the characteristics of the power, pipe, and ancillary tether systems. Another model Is needed for kytoon systems weight. This may be combined with tether weight to determine the required kytoon lift.

Kytoon required lift may be combined with kytoon gas capacity, type, and temperature to compute kytoon size.

We may develop a model to optimize the Stratovine design based on tether weight and kytoon size models.

Optimization results in a set of tether lengths and kytoon sizes for the entire Stratovine.

Relay Tradeoffs

The top relay and ground relay require optimization for any particular Stratovine implementation. In particular, a very simple top relay is lighter and needs less power, but makes inefficient use of the fiber cable, which in turn decreases the total data rate or increases the weight of the cable. The simplest practical top relay probably has a fiber amplifier per fiber and a dedicated fiber pair for each FSO. A minimal cost-effective Stratovine probably supports two FSOs, so a relay that multiplexes two FSOs onto a single fiber pair is (probably) cost-effective if it weighs less than the incremental weight of 30 km of a fiber pair.

If the weight of the top payload and the number of fibers in the tether are both critical constraints, a PONS scheme be may be the optimal design. This is inexpensive but inflexible. In this system, the uplinks are separate sets of wavelengths in one fiber. The top relay splits the wavelength with simple passive optics (e.g., a prism) and sends each group of one or more wavelengths via an optical amplifier to a separate FSO transmitter. Any one wavelength is sent to only one satellite. The downlink is the mirror image of the uplink. All FSO receivers are directed to a passive combiner. The combiner passes the combined signal through an optical amplifier and into a single fiber in the tether.

In the uplink direction, A perfect 30 km fiber without splices induces approximately 6 dB of loss at 1550 nm. This can easily be compensated on the ground by using higher laser power, possibly allowing for a completely passive relay in the uplink direction.

Hydrogen Safety

Hydrogen has been considered unacceptably dangerous for use as a lifting gas. Hydrogen and air form an explosive mixture at any mix from 5% hydrogen to 95% hydrogen, needing only a spark to set off the explosion. Hydrogen is used as a lifting gas for weather balloons. These balloons are considerably smaller than the Stratovine kytoons, but thousands of them are used every year.

The safety analyses may show that the system can be made safe enough that hydrogen can be used even in the lowest kytoons. Alternatively, operational experience with the initial Stratovines may show this.

Hydrogen Pipe

The "hydrogen pipe" element of the tether system is envisaged as a large-diameter soft system of cylinders operating just above local atmospheric pressure over its entire length: it is similar to a long aerostat in construction and appearance. Hydrogen will flow upward by simple displacement: it "floats" up the pipe. The physics of this phenomenon may determine the appropriate diameter for the pipe. If displacement flow is insufficient to provide the necessary makeup hydrogen and fuel to the other elements of the Stratovine, "pumps" can be added at each kytoon. A suitable "pump" is likely to resemble a window fan.

Since the hydrogen in the pipe is near ambient atmospheric pressure, it is lighter than the same volume of air, so it provides net lift to the system. Depending on the pipe diameter, this lift may range from insignificant if the diameter is small, up to sufficient to completely replace the kytoon lift for a sufficiently large diameter. Some or all of it appears as displacement lift of the gas moving up the pipe. If this flow is impeded (e.g., by valves at each kytoon) the lift appears as upward force on the valves. It is not clear that any significant lift appears as a distributed upward force on the walls of the pipe.

At very large diameters the total hydrogen volume becomes a (perceived or actual) safety concern, especially for the lowest regions of the tether where the pipe is near the human population.

The diameter of this pipe is the major contributor to the diameter of the tether as a whole. This in turn is a major contributor to the total wind loading on the Stratovine, and therefore to the required tether strength. Operation with a smaller pipe at higher pressure may be required. It may be necessary to construct the tether with an airfoil cross-section rather than a circular cross-section. There does not appear to be a way to maintain a non-circular cross-section without the use of internal structural elements in tension, compression, or both. This will add to the weight of the tether.

One possible design with an airfoil cross-section starts with a set of pipes with circular cross sections of progressively decreasing size. The largest is near the leading edge and the smallest at the trailing edge. These are maintained at a slight positive pressure. They are surrounded by a membrane that is connected to each pipe to form the exterior of the airfoil. Within the tether, this also forms a series of additional tubes each of which as a three-sided cross section: these tubes are maintained with a very slight positive pressure. The tension element is within the leading edge of the leading pipe. The aircraft lights are inside the leading pipe, if possible: this requires at least portions of the tether to be transparent. The fiber and power components are distributed within the airfoil. It may be appropriate to place a small tension element at the trailing edge of the airfoil.

Satellite FSO Technology

While the Stratovine concept is useful for any satellite uplink and downlink that is subject to atmospheric degradation, it is ideal for optical uplinks and downlinks. This paper assumes that the use of FSO for inter-satellite links is a viable technology that has already been proven or that will be proven in the near term. This may be validated.

This paper assumes that the FSO transceiver for a satellite can be adapted for use at the top of the Stratovine. It may be low weight and able to operate in near-space conditions in the stratosphere, not just in space. It may be able to point in any direction and its pointing may be stabilized against kytoon movement. There may be an acquisition and tracking system to allow the transceiver on the Stratovine and the transceiver on the satellite to point to each other and maintain pointing.

The size of an FSO telescope depends on the required angular resolution and the required light-gathering power. The angular resolution is given by:

$$a = 1.22 \, w/D$$

where w is the wavelength, D is the diameter of the primary lens or mirror, and a is the angular resolution in radians. For example, when w=1550 nm and D=300 mm, $$a = 1.22 \, (1550) \, nm/(300*1000000 \, nm)$$

$$a = 6.3*10^{-7}$$

Thus, at 1000 km a theoretically perfect 3 cm telescope can resolve a spot of size $$d = 6.3*10^{-1} \, m = 63 \, cm$$

Since we use the same size telescope to transmit, its 3 cm "beam" widens to 63 cm, so most of the photons miss the 3 cm target, and we hit with 3 cm$^2$/63 cm$^2$=9/3969=0.002 of the photons, a 26 dB path loss (0.026 dB/km.) This can be improved by using a bigger lens or shorter wavelengths. By comparison, very high quality optical fiber exhibits a loss of 0.2 dB/km.

There are many other losses in the system, but to achieve this result we may point accurately. We assume active tracking. Tracking is a well-understood technology in astronomy, but we may be able to simplify tracking in the FSO environment. Each target can provide an array of omnidirectional beacons at optical wavelengths that are not being used for the data beams. The location of the FSO transceiver relative to the beacons can be published. The receiver can track the beacons by locating them at the edge of the optical field of the telescope. One approach is to use part of the telescope to direct light to a camera, using a variable magnification instead of the maximum magnification used by the data portion of the telescope. Aboard the satellite, the camera can find the Stratovine using dead reckoning and low magnification, and then shift a higher magnification to center the target, and finally to an optimal magnification to track the beacons to keep the telescope exactly centered. It may not be cost-effective to place beacons on the satellite, so a similar approach using a painted target disk or corner reflectors may be employed, but finding a satellite with a 3 cm telescope should be a solvable problem. In any case, while the use of a full camera imaging system is not the conceptually simplest approach, it takes advantage of well-understood image recognition techniques and readily-available components.

FSO Signal Waveforms

The characteristics of optical propagation in free space (vacuum) differ from those in an optical fiber. The waveforms that are optimal for DWDM in optical fiber are likely to be suboptimal for use with FSO equipment. However, optical DWDM technology is highly developed. Therefore, it may be more practical to employ DWDM waveforms with the FSO transceivers instead of developing new technology to exploit optimized waveforms. Analysis is required, but there is almost certainly a tradeoff: a more optimal waveform will allow the use of less power and a lighter FSO transceiver. For the Stratovine itself, this tradeoff is different than for the FSO equipment at the satellite. The waveforms in satellite-to-Stratovine direction need not be identical to those in the Stratovine-to-satellite direction, but the respective receivers may handle the waveform they are receiving.

Even if the waveform itself is as used with long-haul DWDM, the optimal wavelengths for near-space FSO may differ. In particular, wavelengths near 850 nm are unsuitable for long-haul fiber, but are shorter than the 1550 nm wavelength used in the fiber. But for the same resolution, the telescope's diameter is proportional to wavelength, the telescope's volume varies with the cube of the wavelength, and the weight varies approximately with the fourth power of the wavelength.

If analysis shows that the system may use a different waveform or wavelength on the FSO link, then the top relay may transform the waveforms as part of relaying between fiber and FSO. This almost certainly implies that the relay will operate in the electrical domain, at least with technology available in 2014.

Resonance and Tension Power

Any physical system has mechanical resonant frequencies, and if driven will oscillate. In electrical power line systems, physical oscillation of the cables is called "galloping." The Stratovine should be evaluated to determine its resonant frequencies and possible forcing regimes. These will almost certainly include specific sets of steady wind velocities at different altitudes. The Stratovine is an active system, so it can be dynamically "de-tuned" to avoid oscillations or to actively sense and damp oscillations. Active damping requires a way to detect the oscillations, a way to change the resonance, and a control algorithm. The kytoon lift control systems can be used to change the resonance, and the lift control systems will already include one or more sensors whose time-varying output can be used to detect oscillations, notably tension monitors and position monitors. Thus, the only new function needed for the active damping is the control system. More generally, any active feedback system is itself susceptible to oscillation and may therefore be designed to damp oscillations.

If controlled properly, oscillation in the tether tension at the ground can be converted into usable power. The same systems that damp oscillation can also produce controlled oscillation. The "only" additional subsystem that may be added is a massive piston in the ground structure. This piston extracts energy from the oscillation, and therefore acts as an additional damper on the oscillation in addition to producing mechanical or hydraulic power.

One way to convert lift into power without large variations in tether length is to have the kytoon oscillate in pitch. Within the kytoon pistons are connected between the tether and the kytoon's spine. As the pitch varies, the angle between the spine and the tether varies, alternately compressing the pistons. This has a side effect of alternately increasing and decreasing lift, so the kytoons can be synchronized in pairs: as one increases lift, the other decreases lift. This system produces net power if the generated power exceeds the power needed to control the pitch.

Propulsion

Propulsion may be added to a kytoon, in accordance with the present invention, using hydrogen-fuelled motors or electric motors. These can be used to counter the wind loading and thus reduce the maximum tension on the tethers. A problem with hydrogen as an aircraft fuel is storing enough hydrogen for normal flight operations. At low pressure, the volume is very large, while at high pressure, the weight of the storage tank is too high. The Stratovine kytoons do not have this problem, since hydrogen is delivered continuously from the ground.

Propulsion is useful only if sufficient hydrogen can be delivered via the tether to allow a net reduction in the maximum tether stress. A higher requirement for hydrogen may require a larger-diameter hydrogen pipe, in turn adding to the wind loading, and therefore countering some of the effect of the propulsion. The larger pipe may be heavier, and the propulsion system will add weight to the kytoon, thus requiring a larger kytoon with higher wind loading, again countering some of the effect of the propulsion. Unless the propulsion system has a net positive effect in the worst-case wind conditions, the Stratovine system will not have a propulsion system. Note, however, that if hydrogen-fueled heaters or generators are employed, the propulsion system can be integrated with these systems and the incremental weight is lower. If the propulsion system is driven electrically, it can operate in a dual mode, generating electricity during normal wind conditions and acting as a propulsion system only during high wind conditions.

Kevlar

Kevlar may be used to create tension elements for everything from shoestrings to suspension bridges. Spun Kevlar fiber has a tensile strength of about 3,620 MPa, and a relative density of 1.44. However, Kevlar is susceptible to UV degradation and to abrasion, so a practical tension member (e.g., a rope) may be engineered with additional materials. When engineered for a specific environment such as the Stratovine tether, The practical effective strength to mass ratio can be optimized but cannot realistically approach that of the fiber. One example of pure Kevlar braided rope without UV and abrasion protection is half-inch 12-Strand Single-Braided KEVLAR®, listed with a tensile strength of 22,000 lb. and a weight of 7.75 lb/100 ft. An example of a general-purpose rope with UV and abrasion protection is half-inch KRYPTON-K™ DOUBLE BRAID ROPE, listed with a tensile strength of 15,000 lb. and a weight of 7.4 lb/100 ft. We can take the general-purpose rope's characteristics as a lower bound for a specifically-engineered tether. The tensile strength is 66600 N for a weight of 3.356 Kg/30.5 m=110 Kg/km.

The coldest temperature in the stratosphere is about −56° C. Kevlar maintains strength and resilience down to as cold as −196° C. A practical rope has additional material for UV and abrasion protection, and the effect of cold on these materials may be analyzed.

Mylar

From one manufacturer's data sheet, non-metallized Mylar has a density of 1.38 Kg/L, with other attributes that may make it a good choice for the tether fabric and perhaps for the kytoon fabric. To a first approximation, the tether hydrogen pipe is made from five 1-meter widths of fabric. For film of 20 μm thickness, the total volume of a 1-meter section is 100 μm$^3$ or 100 mL, and a 1-kilometer pipe is about 138 Kg.

According to Dupont, Mylar is less permeable to Hydrogen than it is to Helium. Permeability is provided in a graph and increases with temperature. The units are a bit odd: cc/100 in$^2$/24 hr/atm/mil. The graph does not provide temperatures below 0° C. However, The line is linear on a log scale, showing a reduction of a factor of 10 for every reduction in temperature of 75° C., with 40 units of permeability at 0° C. The paper also mentions that coating or metalizing the Mylar can reduce the permeability by a factor of 100. The term "atm" in the denominator would be puzzling, except that the numerator is in cc. This means that while the lost volume increases with decreasing pressure, the actual number of lost molecules (i.e., the mass) of gas does not.

Converting to metric: 1 in$^2$=0.00064516 m$^2$
40 cc/100 in$^2$/24 hr/atm/mil=40 ml/0.064516 m$^2$/84600 s/mil
0.007 ml/m$^2$/s/mil
7 ml/s for 1000 m$^2$ of 1-mil thickness at 0° C. at 1 atm.

Each kytoon has about 20000 m$^2$ of envelope, and each tether has less than 2000 m$^2$. Assume 50 segments: 1100000 m$^2$ of 20 mil thickness, for 7*1100000/20=308000 ml/s=308 l/s=0.308 m$^3$/s of makeup gas. At 1 atm. Just for diffusion, without accounting for leaks.

Fiber-Optic Cable Weight

One provider's documentation (AFL, Aerial Fiber Optic Cable) lists a 12-fiber "outdoor drop cable" with a weight of 50 Kg/km. This cable has cladding that is approximately what will be needed if not otherwise protected in the Stratovine tether. It also includes a tension element sufficient to make it self-supporting in spans up to 120 m. The weight of the actual fibers is apparently a small fraction of the cable weight: the actual number of fibers is not a factor in the provider's specifications. Instead, a maximum number of fibers that can be accommodated by a particular cable configuration determines the weight.

This probably means that the 50 Kg/km is an upper bound on the fiber cable weight for a cable that is specifically engineered for Stratovine.

Fiber-Optic Tether Loss

The Fiber Optic Association's Guide to Fiber Optics Cabling states that each connection in a single-mode cable has a loss of from 0.1 dB to 0.2 db. This is for factory-made fusion connectors. For "field-installed" connectors, the loss can be as high as 0.5 dB. For the Stratovine, we can assume custom-manufactured cable sections with "factory-made" connectors. For 0.2 dB loss and 50 connectors, we have 10 dB of connector loss.

In addition, long-haul single-mode fiber exhibits about 0.2 dB per kilometer of loss, so with 1 km tether sections, we have an additional 10 dB of loss in the fiber, for a total of 20 dB.

Fiber-Optic Transceivers

A reasonable transceiver for a single DWDM Wavelength can be used as a point of comparison. This particular device sends and receives a single channel at 10 Gbps and is designed to operate over up to 80 km of fiber, which approximates our system if we only need 40 segments and connectors. This device consumes 3.5 W electrical. These devices are very light weight (about the size and weight of an old-fashioned pack of five sticks of gum.) They are not physically optimized for a system that supports multiple wavelengths on one fiber pair: they instead connect to a passive optical mux/demux via optical cables. This is acceptable on the ground but is sub-optimal as part of the top relay. Support for an entire 160 wavelengths on one fiber will require 160 of these (560 W.) Presumably, an O-E-O relay would need two of these per data channel, one for the fiber and one for the FSO.

Expected Tension

The Stratovine system has a theoretical tension on the tether of zero at the bottom of each tether segment and when no with is blowing. The tension at the top of each tether segment is simply the weight of that tether segment.

As a practical matter, the tension in a dead calm will be maintained at a positive value for stability, at least at ground level. Let's assume 500 N.

The major component of tension will be due to wind loading. We can draw on the literature from cable structures to find the contribution due to wind loading on the tether, and we can look at the literature on kites and specifically kytoons for the tension caused by wind pressure on the kytoons.

For this, we need equations relating the size of the kytoon to the weight it supports. We assume that based on the kytoon shape, that the kytoon will exert the least lift when the wind is dead calm, so the kytoons may be sized to support the entire weight using only buoyancy in that condition.

Most of the kite literature focuses on increasing the lift. For the Stratovine, the goal is only to minimize lateral displacement, with as small an increase in the tension as possible. As a thought experiment, if the wind blows the Stratovine into a completely horizontal position the tension will in effect be the wind loading on the vertical cross section of each kytoon.

The force vectors operating on an individual kytoon are the "up" tether, the "down" tether, lift, and drag. We can start with a simplified model working with only a single kytoon and no "up" tether. We work in two dimensions, not three. The object of the exercise is to minimize horizontal displacement while staying within some tension limit. The kytoon geometry gives us some control of the kytoon cross section, and we have control of the lift/drag ratio.

In the more general model, we use the equations from top to bottom, with each stage providing the "up" tether force for the next lower stage. This also adds a third dimension since the winds may not have the same direction at different altitudes.

NASA provides basic kite lift equations as part of supplemental material for high school students.

Cost

Reach

We assume that the atmosphere above 30 km is effectively transparent to the wavelengths we wish to use. This means the FSO links operate at any elevation down to 0 degrees, but not below. We can compute the distance at which a satellite at a particular orbital altitude is above our 0-elevation "horizon." For a sample satellite operating in an 950 km orbit, we have:

$Re$=earth radius=6371 km $Av$=Stratovine top altitude=30 km $Rv$=Stratovine top to center of earth=$Rv+Av$=6401 km $As$=satellite orbital altitude=950 km $Rs$=satellite to center of earth=$Re+As$=7321 km $Ds$=Distance from top to satellite sqrt($Rs2-Rv2$)=3606 km $Ls$=degrees from Stratovine to subsatellite point.: $Ds/Rs$=sin($Ls$) $Ls$=$a$ sin($Ds/Rs$): $Ls$=29 degrees.

If this satellite is in an equatorial orbit, we need only about six Stratovines equally spaced along the equator to maintain continuous communications. More interestingly, these six Stratovines can maintain communications with all LEO satellites in orbits of 950 km or higher in equatorial orbit, to the limit of the number of FSO transceivers on each. An additional four stratovines in each hemisphere (a total of 14 Stratovines) can maintain continuous links to all LEO satellites in orbits of any inclination with perigees above 950 km, again subject to availability of FSO transceivers.

This has implications for use with various satellite constellations. From the equator, a single Stratovine can "see" almost half of the geosynchronous arc. Dividing the arc into three segments of 120°, each of three Stratovines can work with 60 geosynchronous "slots" using 60 FSO links. Depending on the technology selected, each FSO link can support very high bandwidth. For example, if we restrict each FSO link to the optical C band to take advantage of existing fiber amplification technology, each link can handle 80 separate wavelengths, each supporting 40 Gbps.

This exceeds the total feeder-link capacity needed by a GEO orbital slot in today's world by more than a factor of twenty.

Interference

There are many sources of visible light that can interfere with our FSO signaling. Above the atmosphere, these include the Sun, Moon, stars, and more diffuse astronomical entities. Most "point sources" (stars and planets) will remain in the field of view of a receiver for extremely short times, possibly causing errors that can be overcome by forward error correction (FEC) encoding. More diffuse interferers (the Milky Way) may be modelled as noise. The Moon is a special case. It is with fairly bright and has an apparent diameter of about 0.5°. The Sun is another special case. Its disk has an apparent diameter of about 0.5° also, but it is so bright that the FSO receiver may be designed to either avoid pointing toward the Sun or to remain undamaged while pointing toward the Sun. In addition, the solar corona is also optically bright out to a larger apparent diameter.

For satellite FSO receivers pointed toward the Stratovine, the Earth (and especially clouds) are in the background and will generate optical noise. For satellites at low elevation, this effect is small because most of the earth and even high clouds are not in the field of view of the satellite. For higher elevations, the problem can be minimized if the kytoon's transceivers are on top of the kytoon, because the satellite's telescope is tightly focused on the top of the kytoon, which is large enough to block the Earth and clouds below it.

There are also three atmospheric phenomena at altitudes above the top of the Stratovine that may affect FSO operations: noctilucent clouds, Aurorae, and sky glow. Each of these phenomena may be examined.

Noctilucent clouds impose two effects: like other clouds, they reflect sunlight and are therefore light sources, and they will also absorb some of the FSO signal when they are between the Stratovine and its target. Aurorae and sky glow are light sources.

There is a class of upper-atmospheric phenomena known as transient luminous events. These include sprites and other rarer phenomena. Sprites are an electrical phenomenon that occurs above the stratosphere (50 km to 90 km.) A sprite is a very short-term luminous discharge. The FSO system will see this as a burst of noise. Sprites occur in conjunction with large areas of thunderstorm activity far below them in the troposphere, and there are millions of them per year. However, the frequency at which any one FSO link will be affected by a sprite is very low.

Atmospheric Pressure

Pressure drops with altitude. In the real world, this effect is complicated by the differences in temperature, but the density (and pressure) of atmosphere may vary exponentially, dropping by half every 5.6 km or equivalently dropping by 1/e every 7.64 km (i.e., Earth's scale height H=7.64 km.) For more accuracy, a widely—accepted model is NRLMSISE-00.

At height z, the pressure will be $P_z$=100 KPa*e(−z/7.64), assuming the same temperature. For example, pressure at 30 km is about 2% of ground level.

Kytoon Overpressure

According to an article on How Stuff Works, blimp overpressure is typically 0.07 psi (0.005 atm.)

This is five thousandths of 100 kPa, or 500 Pa, or 500 N/m$^2$.

Kytoon Size

The kytoons may maintain lift in a dead calm using buoyancy alone. A kytoon's gross lift is equal to the difference between the weight of the air it displaces and the weight of the lifting gas. The net lift is the gross lift minus the weight of the kytoon itself. Gross lift depends on ambient air density, density of the lifting gas, and volume.

Ambient density depends on ambient pressure and temperature. Lifting gas density depends on its temperature and pressure. Stratovine kytoons are at a slight positive pressure. When the lifting gas is hydrogen, enough positive pressure to maintain the kytoon's shape will only add a small amount of weight.

At IUPAC standard temperature and pressure (0° C. and 100 kPa), dry air has a density of 1.2754 kg/m$^3$, From the Hydrogen article, Hydrogen has a density of 0.08988 kg/m$^3$ at 0° C., 101.325 kPa.

With hydrogen, we get about 1.2 kg/m$^3$ lift at standard temperature and pressure. A kytoon with 500 m$^3$ volume has a gross lift of 600 kg.

Based on the scale height formula, we need volume at 5.6 km altitude to get the same gross lift as we get at ground level. Other things being equal, this increases the weight of the kytoon and therefore decreases the net lift.

If we use identical kytoons, each kytoon's envelope area may accommodate the volume of the top kytoon. The lower kytoons will have a smaller volume because of active volume control, but the envelope area is fixed: the volume is controlled by "pleating" the envelope, and at worst case we may assume the entire envelope area is permeable. Assume a blimp shape that is of fixed length but variable effective diameter: Let us assume that at maximum inflation the envelope area may be about 3 times greater than the area of a sphere for the same enclosed volume.

at 0° C. and 100 kPa, 1 m³ of hydrogen will lift a bit more than 1 kg. Ignoring temperature, we will need about 50 m³/kg at 30 km: we need 50,000 m³ to lift a ton: For a sphere:

$$A_s = 4\pi r^2$$

$$V = 4/3 \pi r^3$$

$$r = (3V/4\pi)^{-3}$$

$$A_s/V = 3/r$$

But we are assuming we need 1.5 times the area for our non-spherical kytoon:

$$A_k/V = 4.5/r$$

$$r = 23 \text{ m}$$

$$A = 50000 \text{ m}^3 * 4.5/23 \text{ m}$$

$$A = 9783 \text{ m}^2$$

To a first approximation, at maximum volume the kytoon is a slightly elongated sphere, so the length is about 60 m.

for 20 μm Mylar, This is about 275 kg, leaving 725 kg for operational systems and the tether. But the tether weighs almost this much. Note that there are several worst-case assumptions in this math, however.

Kytoon Volume Control

At maximum volume, the kytoon is a very fat-looking blimp, almost as wide as it is long. We reduce the volume by reducing the diameter without reducing the length: to reduce the volume by a factor of 50 we reduce the diameter by a factor of 7, like a blowfish. We accomplish this by pulling in on a series of pleating lines attached to the envelope. The pleating lines are connected to pulleys on a spinal axle that is on the long axis of the kytoon. The pulleys are in sets of P (one per pleat), with each set pulling in lines that are connected around the same diameter of the kytoon. The pulleys counter-rotate in pairs, so there is no net torque on the spine. The envelope becomes pleated into a across-section of a set of "petals." A practical system should be able to achieve the factor-of-7 reduction in diameter. This implies that the operational systems may fit into the spaces that remain when the balloon is at minimum volume. This specifically includes the internal pressure cells that are used to store the gas when it is compressed to 1 atm.

Assume the need for a rope for each 2 meters of pleat along the length of the spine. The ropes are of different lengths with a maximum of 23 m: assume an average of 15 m. for P pleats, this is 23*P*15 m of rope. Each rope may support a modest maximum tension.

As the diameter decreases, the envelope departs further from spherical, the front-to-back arc length of the top and bottom of the kytoon envelope remain constant. To maintain proper shape, the spine may be lengthened somewhat. If the diameter reduced to zero, the arcs would be π/2 (about 1.5) times the length of the original diameter. However, The actual smallest diameter is about 1/7 of the maximum diameter, and the arc is not necessarily the arc of a circle, but will be somewhat longer. Therefore the spine needs to extend only to about 1.3 times it length at maximum volume.

At neutral buoyancy in a dead calm, the volume control system does not impose much net tension, bending moment, or torque on the spine. However, the weight of the operational systems is supported by the spine, and the counter-acting lifting forces (buoyancy and kite lift) are transferred to the spine via the pleating lines, and the tethers are connected to the spine. In addition, when the volume is not at maximum, the spine is in compression. Therefore, the spine will be an engineered structure. To minimize weight, it will be a truss stabilized by light Kevlar cables.

Using a regular polygon as an approximation, we see that a six-pleat system can reduce the diameter by a factor of 3. This approximation generalizes: P pleats reduce the diameter by a factor of (1+P/3). This means we need 18 pleats to get a factor of 7 reduction. With a 23 m radius, we have a circumference of 145 m. This means each pleat is 8 m wide at the widest point at maximum volume, and only 1.1 M wide at minimum volume. The kytoon as a whole is 6.5 m in diameter at minimum volume.

At the widest diameter and largest volume, each pleating line may haul down about 16 m² of envelope against 500 N/m² of overpressure, or 8000 N force.

Spine

The spine is a complex engineered structure. It may vary in length and remain rigid against several forces. The spine is built around one or more carbon fiber tubes of fixed length somewhat less than the shortest operational length. At each end of the spine, there is a smaller diameter carbon fiber tube nested within the fixed tube. An extension mechanism can slide these tubes out to lengthen the spine. When the smaller tube is at its maximum extension, a portion of its length remains within the outer tube. When the smaller tube is at its minimum extension, it exposes only half as munch length as when it is at maximum extension. To permit spinal extension by one third (to a total length of 4/3 of the minimum) the fixed tube may be half the length of the minimum diameter and each extension tube may be ⅓ the length of the minimum diameter plus the overlapping portion. For a 23 m base radius, the extensions are each about 14 m long, and extend from a 6 m minimum to a 12 m maximum.

The Spine is a tensile structure similar to the rigging on a sail boat. It incorporates carbon composite compression members ("spreaders") and Kevlar tension members ("shrouds.") This rigging is static for the fixed tube. The rigging for the extenders is adjusted as the extenders move. By contrast with modern sailing rigs the spindle is not directly subject to wind, since the gas within the envelope does not move with respect to the spindle. Therefore, it is designed for minimum mass without regard to wind load.

The pleating pulleys are near the spinal tube and bring the envelope creases near the spinal tube when the envelope is at minimum volume. Therefore, the spinal rigging is designed such that the shrouds and spreaders are within the envelope petals at minimum volume. There is no requirement to have rigging in each petal. For example with 18 petals we are free to design with rigging in six petals. Since these spaces are radially symmetrical about the spine, this easily allows for a design that is rigid against bending forces. However, it is not intrinsically rigid against torsion. The kytoon system does not impose any large-scale torsion on the spine. Smaller-scale torsion forces can be opposed within the diameter of the non-rigged center portion of the spine. While the fixed spine and each extension can separately be designed to oppose torsion, a design that can convey torque between the extenders and the fixed spine is more challenging. However, there should be almost no applied torque at these locations.

The location of the pleating pulleys very near the ends of the spine may be analyzed. If there were no extenders this would be simple. Fortunately, these lines are short and do not require much force, since the area to be pleated in these locations is small. One approach simply places the pulleys at the ends of the fixed spine. This causes the pleating points to be pulled more toward the center of the kytoon rather than directly toward the spine, but this may be an advantage.

As the envelope volume is decreased, the envelope will tend to pull the extensions out of the fixed portion of the spine, much as a toy balloon elongates when it is squeezed in the middle. However, there are several possible opposing forces. Most notably, wind pressure against the nose of the kytoon will be transferred to the forward extension. If the pleating pulleys are all on the fixed spine, they will tend to oppose the elongation. Therefore, the extender system may oppose both tension and compression.

Gas Compression

We compress gas to save it when we reduce volume to reduce buoyancy when we are depending on kite lift. A compressor such as a supercharger can move a large volume against a low pressure differential or a small volume against a higher pressure differential. At constant altitude, we can rapidly compress from the maximum volume, but it will take longer to compress when we reach half volume.

The compressor is not used during descent except perhaps to adjust for kite lift. The gas volume will be compressed by the ambient air pressure, and the volume control ropes can adjust the envelope to maintain the overpressure.

Tether Connection

The upward and downward tethers are connected to a tether hub that is connected to the spine at the kytoon's center of lift. The kytoon has two access tubes, one for each tether. The tether hub comprises a tension system, a gas management system, a fiber connection system, and a pitch control system. The kytoon volume control system may account for attachment of the downward and upward tethers and of the attitude control lines. The pleats will be arranged so that there is a top crease and a bottom crease: that is, one row of pleating lines extends vertically upward from the spine and the opposite set of pleating lines extends vertically downward from the spine. The tubes are in the two vertical creases.

Tether Access Tubes

There is flexible a tube of envelope material from each of the two vertical pleats to the spine, open to the atmosphere at its outer end and sealed to the tether hub. These tubes allow the tethers to be connected to the hub. This material and the material near the ends of the tether is coated with a slick and tough material such as Teflon. Each tube is narrow in the "side-to-side" direction perpendicular to the spine, but is longer in the "front-to-back" direction parallel to the spine. Since the outside of each tube is the inside of kytoon envelope, the tubes are held shut against the tether by the pressure in the kytoon. Each tube is between two of the pleating lines and occupies the entire distance between them. These tubes are as long as the radius of the kytoon at maximum volume and collapse to shorter lengths as the pleating lines are shortened. The collapse is guided by grommets on the tube that slide along the adjacent pleating lines. These lines and grommets also maintain the front and back edges of each tube away from each other against the kytoon internal pressure.

When the kytoon is not at maximum volume, the tether is in contact with a portion of the envelope material that forms the crease between the two "petals" adjacent to the pleat to which the tube is connected. The portions of the envelope material that can come into contact with the tether are coated with the same slick and tough material as the tube and tether end.

The front-to-back length and placement of these tubes may be analyzed. The tubes may allow for all operational attitudes of the kytoon with respect to both tethers as the kytoon adjusts pitch with respect to the wind. Although attitude change with respect to the wind is likely to remain in a small range (perhaps 20 degrees up and 10 degrees down) the angles of the two tethers are not so obviously constrained. In windless conditions both tethers are vertical (and attitude is irrelevant) but winds at different altitudes differ, so the two tethers, while always pulling in exactly opposite directions, can form any angle with respect to the wind. The kytoon will orient itself to face the wind, and the tether tension will cause the kytoon to roll until its roll attitude matches the tether direction, but the tether is still at some angle with respect to the desired pitch. At one extreme, the tethers theoretically reach horizontal with the bottom tether to the front. In this condition however, we also want to exert maximum lift, so the pitch is very high with respect to the wind, and therefore the kytoon spine is still near perpendicular with respect to the tethers.

At the other extreme, lower kytoons are experiencing winds opposite in direction to higher kytoons, while the total force on the higher kytoons exceeds that on the lower kytoons. In this condition the lower tether on the lower kytoon extends nearly horizontally toward the rear of the kytoon. In this condition, increased drag is an advantage, so we simply leave the kytoon at maximum volume and set the tether-relative pitch to is upward maximum. The wind-relative pitch is still downward, but the kite-like lift of the kytoon is minimal when the kytoon is at maximum volume. It may be possible to adjust the volume ropes to produce an asymmetrical kytoon shape that minimizes or even reverses the downward lifting force of the wind, for example by reducing the diameter only of the forward portions of the kytoon.

Pitch control becomes increasingly important as the wind speed increases. More wind means more kite lift, so we reduce the buoyancy by reducing kytoon volume. This reduces the length of the access tubes, and at the extreme, the tubes are completely collapsed and the outside end of tubes reach the hub. At this point, there is almost no constraint on the pitch. We can also achieve this by reducing the top and bottom pleats while leaving the others expanded. This brings the outer ends of the tubes into contact with the tether hub and allows the kytoon to bring the pitch much closer to horizontal with respect to the tethers.

Tension

The tension connection system comprises a rigid tension member extending perpendicularly downward from the spine with tether tension attachment points at top and bottom. This member is usually under tension and may handle as much tension as the tether. It is also a structural part of the pitch control system and under unusual conditions it will briefly be under a modest amount of compression. The tension member has tension connectors to mate to the tethers.

Pitch Control

The tension member is hinged to the spine so that the spine can rotate in the vertical plane with respect to the tension member. Two pitch control ropes connect the bottom end of the tension member the spine, with one connecting toward the front and one toward the back. The pitch control ropes are actively shortened and lengthened using winches to vary the angle of the spine and the tension member. The portion of the spine between these attachment points is under considerable compression and is also under a bending stress, so it may be designed accordingly. The bending stress can be countered by extending the tension member vertically and adding an additional pair of pitch control ropes above the spine.

Note that this scheme cannot be easily extended to provide roll control. The mechanics of the tether connections and the existence of the top tether constrain the kytoon: "vertical" is the direction of the tension along the two tethers, so the kytoon cannot roll with respect to the tethers. Instead of rolling to change the lift vector to provide lateral force, the control system varies the length of the pleats, causing the kytoon's cross section to be asymmetrical. This provides a lateral component to the lift vector.

Fiber Connection

The tether may be manufactured so that the optical fiber elements extend beyond the tension member by about two meters. This provides enough slack to permit the fiber connectors from each tether to be connected directly to each other. One fiber pair from each tether is connected to connectors on the tether hub: this provides the path for control signaling. The remaining fibers are passed through a conduit in the tether hub that connects from one of the tubes to the other, and the fibers from the bottom tether are then connected to those in the top tether.

Gas Connection

The tether hub includes a gas management system. This has connections for the gas pipes in each tether. It also has controllable valves to permit gas flow from the interior of the envelope to the gas pipe into the pipe and from one pipe to the other. These valves "fail soft:" when the control system fails, the envelope is shut away from the pipe and the pipes are connected to each other. The valves are large low-pressure valves, possibly made of fabric.

Wind Loading

Wind exerts a force on each kytoon and tether segment. We may determine the maximum "credible" wind velocity at each altitude. Velocities in the troposphere (up to about 10 km) can reach 300 km/h. Velocities above this altitude can reach about 150 km/h. Both the horizontal and vertical components of the velocity may be considered, as may rapid changes in velocity (gusts, microbursts, etc.)

Drag depends on the properties of the fluid and on the size, shape, and speed of the object. One way to express this is by means of the drag equation:

$$F_D = \frac{1}{2}\rho v^2 C_D A$$

where
$F_D$ is the drag force,
$\rho$ is the density of the fluid,
$v$ is the speed of the object relative to the fluid,
A is the cross-sectional area, and
$C_D$ is the drag coefficient—a dimensionless number.

The drag coefficient depends on the shape of the object and on the Reynolds number:

$$R_e = \frac{vD}{v}$$

where D is some characteristic diameter or linear dimension and $v$ is the kinematic viscosity of the fluid (equal to the viscosity $\mu$ divided by the density). At low Reynolds number, the drag coefficient is asymptotically proportional to the inverse of the Reynolds number, which means that the drag is proportional to the speed. At high Reynolds number, the drag coefficient is more or less constant.

A blimp shape as a very low drag coefficient. According to the physics.info article on drag, the coefficient is on the order of 0.02.

According to a NASA description of shape effects on drag, a cylinder's drag coefficient varies in a complex way with wind velocity, from 0.07 up to 0.5.

For the kytoons, we note for a fixed net lift, the cross-section increases as a function of density decrease. If density decreases by a factor of 8, volume increases by a factor of 8 and cross-section by a factor of four. So, for a given wind velocity, net lift, and drag coefficient, Force increases as density decreases.

Example: consider a wind velocity of 200 km/h at a density of 0.125 atm. The cross section for a blimp shape is roughly half the cross section of a sphere of equivalent volume. Required volume is 4000 m³, so A=377 m².

$$F_D = \frac{1}{2}\rho v^2 C_D A$$

$F$=0.5*0.1*1.22 kg/m³*0.02*377 m²*(200 km/h)²

$F$=1420 N.

Drag, lift, and the force on the tether may balance: lift is perpendicular to drag, so the kytoon may displace enough that the tether is at an angle to perpendicular, which gives the tether force a horizontal component. For example, at an angle of 45 degrees, the net additional lift is 1420 N and the net additional tether force is 1.4*1420 N=2000 N.

Wind loading in the tether is distributed. Assume a tether cross section of 1000 m*0.37 m: same area but a factor of three higher drag coefficient, this multiplies the required lift and tether tension by a factor of four, to 8,000 N However, each kytoon also has a top tether. The top tether adds a lift force and a horizontal force. The lift force relieves us of the responsibility to add net lift, but the horizontal force from the top tether is in the same direction as the drag, so it may be transmitted as a horizontal force to the bottom tether. To a first approximation, the lower tethers may get stronger, with the lowest a factor of 30 stronger than the highest, when the wind direction is the same at all heights.

A practical Kevlar rope with a 1.2 cm diameter has a maximum working tension of about 66,600 N: The topmost five kytoons can use this. The rest of the Stratovine tethers may be larger.

This analysis shows that the tether drag has a large effect on the required tether strength. We can reduce the tether diameter, or reduce the tether drag coefficient, or both. The largest contributor to the tether diameter is the hydrogen pipe. We can reduce its diameter by reducing hydrogen demand, or by increasing the pressure, or both. We can decrease the coefficient by changing the shape from cylinder to an airfoil. We may also revisit the actual drag coefficient: if it is lower for higher wind velocity, maximum tension is dramatically reduced.

From this analysis, the contribution of the wind loading on the tether is independent of the number of kytoons along the tether. If there were no intermediate kytoons, the top kytoon would be required to oppose the entire tension of the tether plus its weight, and the point of maximum tension would be at the top of the tether. With intermediate kytoons, much of the lift is provided at lower altitudes, and The point of maximum tension is the top of the lowest tether segment.

Rain

Rain and condensation will add weight to kytoons and tethers. If the tether has a smooth water-repelling surface, the total load will be proportional to the surface area. This should be a small increment on the dry weight.

Rain accumulation in the "creases" of the pleats may be considered. This water will make it way to the bottom of the crease. The bottom of the crease is not normally level, but is instead an arc, so the water will flow toward the front or back and eventually exit at the end of the crease. However, We may need to design the envelope with a tape along each crease to hole the bottom of the crease open against the Kytoon overpressure.

Icing

Ice accumulation is a concern for any aerial structure. Icing will occur on kytoons and tethers in the lower troposphere, and probably also on the higher portions of the Stratovine. Ice mitigation is well understood. Two approaches are used for aircraft: heating and mechanical removal by physically expanding surfaces. For the kytoons and (probably) the hydrogen pipe, physically expanding and contracting the structure using small pressure changes will probably be effective, For the kytoons (but probably not for the tether) heating is likely to be useful for areas where expansion is ineffective. If expansion and contraction of the tether is the design method for de-icing, the tether may be designed so that the entire exterior of the tether structure is de-iced. One approach might be to place all elements of the tether inside the hydrogen pipe. This is conceptually simple except for the aircraft warning lights.

The tether can be expanded and contracted either by controlling the pressure directly, or by constructing it so that the diameter changes with changes in tension.

Ice may tend to separate in large sheets. This effect may be analyzed, but it is almost certain that sheets falling from above the lowest kytoon will decompose before reaching the ground. If ice sheets from the lowest kytoon or the lowest tether are a concern, Then heat instead of expansion may be used here. This is consistent with using a hot air kytoon as the lowest kytoon but will require additional equipment if the lowest kytoon is a hydrogen kytoon.

On-Board Hydrogen Storage

A kytoon may need to store hydrogen at higher pressure to reduce its volume without venting hydrogen as part of a system to reduce the kytoon's cross section. When there is enough wind to justify this volume reduction, kite lift is sufficient for the kytoon to support its portion of the tether, so there is no need to maintain any buoyancy. It is useful to reduce the kytoon's cross section to reduce total drag, and this in general requires the kytoon volume to be reduced. The required pressure is modest by comparison with typical gas storage systems, so a fabric storage vessel is feasible. This storage system takes the form of a constant-volume pressurized balloon within the variable-volume kytoon envelope, essentially reversing the function of a classical ballonet.

The constant-volume balloon will need to maintain increased pressure. Assume we desire to maintain a differential pressure of 100 kPa. (about one atmosphere.) A balloon comprising multiple spheres of Kevlar-reinforced fabric can easily handle this. These spheres need not be completely impervious to diffusion. For the lowest kytoon 100 kPa of differential pressure reduces the volume by a factor of two. For a kytoon at an altitude where ambient pressure is 10 KPa, 100 kPa of differential pressure allows reduction of kytoon volume by a factor of ten. This is a useful effect, since the higher kytoons have higher cross sections in a dead calm, and total tension reduction is more sensitive to cross sections at higher altitudes.

As an example, consider the use of a single kytoon design to be used at all altitudes. The "base volume" for this balloon is its volume at neutral buoyancy at 100 KPa ambient pressure. In a dead calm, this balloon expands to 50 times its base volume when it operates at 30 km. it contains a storage balloon that is half of its base volume and that is initially at the same pressure as the kytoon envelope. On the ground, we can pressurize the storage balloon to 100 kPa relative (200 kPa absolute) and reduce the Kytoon envelope volume all the way down to the storage balloon envelope, cutting the gross buoyancy by half. At 30 km, we can pressurize the storage balloon to 100 kPa relative (102 kPa absolute) and reduce the volume by a factor of 25.

Hydrogen Energy

The Stratovine may use hydrogen as a power source if it is feasible. Hydrogen has a high energy density by weight but a low energy density by volume. According to the article at the Hypertextbook site, the Energy density of hydrogen is 33.3 kWh/kg.

But we know that at normal temperature and pressure (NTP), hydrogen gas has a mass of 0.09 kg/m$^3$. Therefore, we have only about 3 kWh/m$^3$ at the bottom of the tether. Heaters will be 100% efficient (except for hydrogen loss in the delivery system) but generators or fuel cells will operate somewhere below 25% efficiency: let's assume 0.5 kWh/m$^3$ as our electrical output. Delivered at the top kytoon at 2% of NTP, we need 100 m$^3$/h to produce 1 kWh. If the tether's hydrogen pipe has a 0.1 m$^2$ cross section, the hydrogen may flow at 1 km/h per kWh in the topmost tether section.

It is possible to produce lightweight turbine-powered electrical generators. Azmark aero has produced a unit weighing less than 5 Kg and generating more than 4 kW. This particular unit uses "heavy fuel," but turbine power/mass ratio appears to be generally independent of fuel type. Endurance is unknown. Large turbines are notable for very long lifetimes, but this attribute may not scale. The turbine is likely to be the limiter on the maintenance interval for a Stratovine kytoon.

Tether Tension Power

Oscillation in tether tension can be converted to mechanical power and thence via a generator into electrical power. The basic equation is:

$$W = N \times m/s$$

That is one newton of force operation through one meter of distance in one second will produce one Watt of power. For example, if we can introduce an oscillation such that tether tension varies sinusoidally with an RMS variance of 10,000 N with a 5-second period through a 1-meter movement, we can extract an average of 2 kW.

Kytoon Operations

The operational payloads of each kytoon require power for control electronics, attitude actuators, volume control actuators, aircraft warning lights, and heaters.

The electronics will take an average power of <10 W.

Each aircraft warning light flashes 40 times a minute at 240,000 cd (candelas). We will need five rings of three lights per kilometer: 15 lights. If we assume 1 W can produce about 10 cd continuously and we assume a strobe is one millisecond, we need 12 W per light, or 180 W for the 15 lights. (Warning: these estimates are little more than wild guesses.)

The attitude actuators are geared stepper motors or some equivalent. There are several of them (at least two.) They adjust the angle of attack of the kytoon by shortening or lengthening lines that are attached to the tether below the main tension-bearing attachment point. The system is arranged so that one line is lengthened as another is shortened, so only a modest amount of power is needed. The average power depends on the frequency of adjustments and is probably negligible. The instantaneous power demand is unknown, but a guess is 100 W max.

The volume control system consists of a compressor and a set of one stepper actuators that can lengthen and shorten pleating lines to affect the diameter of the envelope. As with the attitude actuators, these operate intermittently. However, these operate less frequently but require more instantaneous power. As the wind decreases, we need to expand the envelope. This requires releasing the compressed gas while relaxing the pleating lines to permit the envelope to expand. These activities require almost no power. As the wind increases, we may compress gas and reduce the envelope size. These activities require power. This raises the possibility that the system should employ wind power for this purpose, since we only need to do this when there is substantial available wind power. The use of wind power here increases the tether tension at a time when we are attempting to reduce tether tension, but if the system is designed correctly the effect is both small and temporary. A cleverly designed system may be almost completely mechanical, driving the compressor and envelope actuators directly from a propeller driveshaft or tether shock absorber. This power budget assumes an additional instantaneous power of zero for the electrical system.

Top Payload

The top kytoon supports the top payload in addition to the kytoon operational payload. The top payload includes the relay and the FSO transceivers. Each transceiver has a tracking system which includes motors and electronics. We assume that the FSOs are fairly low mass and that they use a four-axis gimbal. A four-axis gimbal avoids "gimbal lock" and causes the telescope to be inertially stabilized, so little motor power is needed to maintain the pointing. Each transceiver takes less than 10 W total except for any optical amplifiers.

We use a multi-fiber optical amplifier, so all of the fibers share the same optical "pump" power source. Assume this source uses 50 W.

Assume 50 W for the payload control electronics.

This leaves the Relay. The relay power depends on function. A multichannel O-E-O function can consume 1000 W or more.

It appears that the top payload will require a generator or power from the tether. A generator is problematic at this altitude: it will need a very substantial compressor to gather enough oxygen to burn the hydrogen.

Height Versus Tether Length

The record altitude for a single kite was 4422 m. The tether was 7310 m.

The record altitude for a string of kites was about 10,000 m, using a string of 8 kites in 1919.

Hydrogen Arcing

A large gas-filled balloon is potentially subject to internal arcing when in a high-gradient electrical field. This occurs when the voltage differential exceeds the breakdown voltage of the gas. This will generally not occur when the breakdown voltage is higher that the breakdown voltage of the surrounding air, since the air will break down first and relieve the voltage differential. In some embodiments, the breakdown voltage of hydrogen is 0.65 relative to that of air, so this effect may be considered. The effect is much less severe than in Helium, which has a much lower breakdown voltage. We mitigate this effect by adding conductors to the balloon envelope. The required spacing of these conductors is related to the breakdown voltage.

Hydrogen and Helium Prices

Helium costs more than 30 times as much as hydrogen.

With the advent of hydrogen-fueled vehicles, the price of Hydrogen is about $1.80/kg. This is about $0.18/$m^3$ at 1 atm. Hydrogen can be produced on site at about this price. The cost is driven primarily by the price of electricity.

Helium costs about $6.13/$m^3$ (presumably at 1 atm.) The price is volatile. It would need to be transported to the site.

Corner Reflectors

These fit in a six-inch cube and weigh less than 4 oz. They are available from Skyprobe. It is not clear if they are effective from inside the envelope material of a kytoon or tether.

Summary

In accordance with the present invention, and as illustrated in the figures, an apparatus for satellite communication comprises a plurality of kytoons (11). Each kytoon (11) of the plurality of kytoons includes a hub (12) positioned within the kytoon, an adjustable spine (13) that is connected to the hub (13) and varies a diameter and volume of the kytoon (11), and first and second tether access tubes (14) that are each open to the atmosphere at one end and are sealed to the hub of the kytoon at another end.

The apparatus further comprises a plurality of tether segments (15) including a first tether segment (15(*a*)) and a second tether segment (15*b*), the first tether segment is connected to an anchor connected to the earth at one end of the first tether segment and to a first hub of a first kytoon at another end of the first tether segment, the first tether segment connected to the first hub through the first tether access tube of the first kytoon, and the second tether segment is connected to the first hub of the first kytoon at one end of the second tether segment, through the second tether access tube of the first kytoon, and to a second hub of a second kytoon at another end of the second tether segment through the first tether access tube of the second kytoon.

The apparatus further comprises a pipe (16) enclosed in the plurality of tether segments (15) and that provides a lighter-than-atmospheric gas from a gas source to at least one kytoon of the plurality of kytoons so that the at least one kytoon is inflated with the lighter-than-atmospheric gas, a communication device (18) connected to one of the kytoons, and a fiber optic cable (17) enclosed in the plurality of tether segments (15) and connected to the communication device (18).

Obviously, numerous modifications and variations of the present invention are possible in light of the above teachings. It is therefore to be understood that within the scope of the appended claims, the invention may be practiced otherwise than as specifically described herein.

The invention claimed is:
1. An apparatus, comprising:
a plurality of kytoons, each kytoon of the plurality of kytoons including
a hub positioned within the kytoon,
an adjustable spine that is connected to the hub and varies a diameter and volume of the kytoon, and first and second tether access tubes that are each open to the atmosphere at one end and are sealed to the hub of the kytoon at another end;

a plurality of tether segments including a first tether segment and a second tether segment, the first tether segment is connected to an anchor connected to the earth at one end of the first tether segment and to a first hub of a first kytoon at another end of the first tether segment, a part of the first tether segment passing through the first tether access tube of the first kytoon so that the first tether segment is connected to the first hub, and the second tether segment is connected to the first hub of the first kytoon at one end of the second tether segment and to a second hub of a second kytoon at another end of the second tether segment, a first part of the second tether segment passing through the second tether access tube of the first kytoon so that the second tether segment is connected to the first hub and a second part of the second tether segment passing through the first tether access tube of the second kytoon so that the second tether segment is connected to the second hub;

a pipe enclosed in the plurality of tether segments and that provides a lighter-than-atmospheric gas from a gas source to at least one kytoon of the plurality of kytoons so that the at least one kytoon is inflated with the lighter-than-atmospheric gas;

a communication device connected to one of the kytoons; and a fiber optic cable enclosed in the plurality of tether segments and connects the communication device to a terrestrial network, wherein the communication device is a free-space optical transceiver that communicates with a satellite in orbit.

2. The apparatus according to claim 1, wherein each kytoon of the plurality of kytoons has a different volume than the other kytoons of the plurality of kytoons, each kytoon is positioned in the chain by ascending volume so that a kytoon with a smallest volume is at a first position closest to the anchor and a different kytoon with a largest volume is at a second position farthest from the anchor.

3. The apparatus according to claim 1, wherein the pipe provides gas from the gas source to each of the kytoons in the plurality of kytoons, and the volume of each kytoon is individually adjustable by providing gas to each kytoon through the pipe.

4. The apparatus according to claim 1, wherein the first kytoon is inflated with hot air.

5. The apparatus according to claim 1, wherein the gas provided by the pipe is hydrogen.

6. The apparatus according to claim 1, further comprising:

a managing device provided with an individual kytoon of the plurality of kytoons, wherein the managing device adjusts an amount of lift of the individual kytoon.

7. An apparatus, comprising:

a tether connected to an anchor at a first end of the tether;

a plurality of kytoons connected by the tether in a chain; and a pipe secured to the tether and that provides gas from a gas source to a kytoon in the plurality of kytoons, wherein the volume of the kytoon is adjustable by providing gas to the kytoon through the pipe, each kytoon of the plurality of kytoons has a different volume than the other kytoons of the plurality of kytoons, each kytoon is positioned in the chain by ascending volume so that a first kytoon with a smallest volume is at a first position closest to the anchor and a second kytoon with a largest volume is at a second position farthest from the anchor, when the plurality of kytoons are inflated with lighter-than-atmospheric gas and a communication device is connected to an end of the chain farthest from the anchor, the communication device is provided at the elevated position for satellite communication, and the communication device is a free-space optical transceiver that communicates with a satellite in orbit.

8. The apparatus according to claim 7, further comprising:

a fiber optic cable secured to the tether and extending from the anchor to the end of the chain farthest from the anchor, wherein when the fiber optic cable is connected to the communication device and a second communication device at an anchor end of the fiber optic cable, the fiber optic cable relays signals between the communication device and the second communication device.

9. The apparatus according to claim 7, wherein the pipe provides gas from the gas source to each of the kytoons in the plurality of kytoons, and the volume of each kytoon is individually adjustable by providing gas to each kytoon through the pipe.

10. The apparatus according to claim 7, wherein the first kytoon is inflated with hot air.

11. The apparatus according to claim 7, wherein the gas provided by the pipe is hydrogen.

12. The apparatus according to claim 7, further comprising:

a managing device provided with an individual kytoon of the plurality of kytoons, wherein the managing device adjusts an amount of lift of the individual kytoon.

* * * * *